(12) United States Patent
Tagawa et al.

(10) Patent No.: US 7,984,583 B2
(45) Date of Patent: Jul. 26, 2011

(54) PLANT PUNCH METHODS AND APPARATUS

(75) Inventors: George H. Tagawa, Brighton, CO (US); Kenneth K. Tagawa, Brighton, CO (US); Randall E. Tagawa, Brighton, CO (US); Fred Naylor Blackmore, Jr., Saline, MI (US)

(73) Assignee: Tagawa Greenhouse Enterprises, LLC, Brighton, CO (US)

( * ) Notice: Subject to any disclaimer, the term of this patent is extended or adjusted under 35 U.S.C. 154(b) by 986 days.

(21) Appl. No.: 10/599,107

(22) PCT Filed: Mar. 26, 2004

(86) PCT No.: PCT/US2004/009308
§ 371 (c)(1),
(2), (4) Date: Sep. 19, 2006

(87) PCT Pub. No.: WO2005/102028
PCT Pub. Date: Nov. 3, 2005

(65) Prior Publication Data
US 2007/0068075 A1    Mar. 29, 2007
US 2011/0162274 A9    Jul. 7, 2011

Related U.S. Application Data

(63) Continuation-in-part of application No. 10/470,282, filed on Jul. 24, 2003, now Pat. No. 6,779,300, which is a continuation-in-part of application No. 10/167,693, filed as application No. PCT/US02/02257 on Jan. 24, 2002, now Pat. No. 6,915,607.

(60) Provisional application No. 60/296,915, filed on Jun. 8, 2001, provisional application No. 60/276,874, filed on Mar. 14, 2001, provisional application No. 60/273,420, filed on Mar. 5, 2001, provisional application No. 60/263,802, filed on Jan. 24, 2001, provisional application No. 60/296,915, filed on Jun. 8, 2001.

(51) Int. Cl.
*A01C 11/02* (2006.01)

(52) U.S. Cl. .................................................. 47/1.01 P

(58) Field of Classification Search ................ 47/1.01 P, 47/1.01 R, 1.7; 111/114, 104, 105; 414/416.09, 414/416.11; 198/468.6
See application file for complete search history.

(56) References Cited

U.S. PATENT DOCUMENTS
3,331,155 A    7/1967    Chancellor
(Continued)

FOREIGN PATENT DOCUMENTS
DE    19642823 A1    4/1997
(Continued)

OTHER PUBLICATIONS

U.S. Appl. No. 60/263,802, entitled "Growing System to Maximize Plant Transplanting Yields", filed Jan. 24, 2001.
(Continued)

*Primary Examiner* — Son T Nguyen
(74) *Attorney, Agent, or Firm* — Santangelo Law Offices, P.C.

(57) ABSTRACT

Embodiments focus on imparting a horizontally shifting motion to a plant punch element 1 during a part of a plant punch cycle 18 so as to reduce contact of a plant punching surface 38 with the plant during the plant punch. Plant punch elements that are particularly suited for such "shifting" capability may include a gap 41 facilitating lateral movement of the plant punch element to a position around at least part of the plant to be punched. Aspects of the inventive technology also address a sheltering plant punch apparatus that can also reduce injury and stress experienced by the plant while it is punched. Combinations of aspects disclosed herein provide a high degree of protection to the plant during a plant punch, thereby reducing stress experienced by the plant during the punch.

60 Claims, 32 Drawing Sheets

U.S. PATENT DOCUMENTS

| | | | |
|---|---|---|---|
| 3,386,608 | A | 6/1968 | Diller |
| 3,446,164 | A | 5/1969 | Huang et al. |
| 3,447,261 | A | 6/1969 | Hundt |
| 3,517,629 | A | 6/1970 | Bridges et al. |
| 3,524,419 | A | 8/1970 | Middleton |
| 3,561,158 | A | 2/1971 | Marcan |
| 3,571,971 | A | 3/1971 | Broersma |
| 3,712,252 | A | 1/1973 | Huang |
| 3,799,078 | A | 3/1974 | Blackmore et al. |
| 3,820,480 | A | 6/1974 | Blackmore et al. |
| 3,903,643 | A | 9/1975 | Blackmore et al. |
| 3,949,523 | A | 4/1976 | Lehtipuu |
| 4,050,921 | A | 9/1977 | Plant et al. |
| 4,106,414 | A | 8/1978 | Vastag |
| 4,120,692 | A | 10/1978 | Plant et al. |
| 4,156,395 | A * | 5/1979 | Edwards et al. ............... 111/105 |
| 4,197,674 | A | 4/1980 | Blackmore, Jr. |
| 4,244,308 | A | 1/1981 | Vince |
| 4,248,014 | A | 2/1981 | Williames |
| 4,388,035 | A * | 6/1983 | Cayton et al. ............ 414/416.04 |
| 4,389,814 | A | 6/1983 | Andreason et al. |
| 4,408,549 | A | 10/1983 | Qvarrstrom |
| D272,726 | S | 2/1984 | Kaneko |
| 4,459,924 | A * | 7/1984 | Hassan et al. ................. 111/104 |
| 4,481,893 | A | 11/1984 | Qvarrstrom |
| D278,323 | S | 4/1985 | Blackmore, Jr. |
| 4,616,578 | A | 10/1986 | Talbott |
| 4,644,880 | A | 2/1987 | Branch |
| 4,910,146 | A | 3/1990 | Tur-Kaspa et al. |
| 4,947,579 | A | 8/1990 | Harrison et al. |
| 4,947,582 | A | 8/1990 | Visser |
| 5,048,434 | A | 9/1991 | Forster et al. |
| 5,215,550 | A | 6/1993 | Tesch, Jr. et al. |
| 5,225,345 | A | 7/1993 | Suzuki et al. |
| 5,247,761 | A * | 9/1993 | Miles et al. ................. 47/1.01 R |
| 5,257,889 | A | 11/1993 | Suzuki et al. |
| 5,320,649 | A | 6/1994 | Holland |
| 5,365,693 | A | 11/1994 | van Wingerden et al. |
| 5,425,202 | A | 6/1995 | Mekler |
| 5,557,881 | A | 9/1996 | Bouldin et al. |
| 5,573,558 | A * | 11/1996 | Huang ....................... 47/1.01 R |
| 5,644,999 | A | 7/1997 | Williames |
| 5,746,566 | A | 5/1998 | Pfarr |
| 5,765,491 | A * | 6/1998 | Brower et al. ................. 111/105 |
| 5,779,048 | A | 7/1998 | Dunn |
| 5,779,049 | A | 7/1998 | Werby et al. |
| 5,842,306 | A * | 12/1998 | Onosaka et al. ........... 47/1.01 R |
| 5,868,086 | A | 2/1999 | Williames |
| 5,871,102 | A | 2/1999 | Lambert |
| 5,911,631 | A * | 6/1999 | Bouldin et al. ............ 47/1.01 R |
| 5,935,841 | A | 8/1999 | Trinci et al. |
| 5,967,739 | A | 10/1999 | Bennison |
| 5,979,111 | A | 11/1999 | Brown et al. |
| D419,913 | S | 2/2000 | Thomas et al. |
| 6,029,425 | A | 2/2000 | Dunn |
| 6,044,778 | A * | 4/2000 | Shokaku et al. ............... 111/105 |
| 6,085,462 | A | 7/2000 | Thomas |
| 6,385,903 | B1 | 5/2002 | Diller et al. |
| 6,679,300 | B1 | 1/2004 | Sommer et al. |
| 6,779,300 | B2 | 8/2004 | Tagawa et al. |
| 6,915,607 | B2 | 7/2005 | Tagawa et al. |
| 2003/0029087 | A1 | 2/2003 | Tagawa et al. |
| 2003/0232188 | A1 | 12/2003 | Tagawa et al. |
| 2005/0045079 | A1 | 3/2005 | Tagawa et al. |

FOREIGN PATENT DOCUMENTS

| | | |
|---|---|---|
| GB | 2201323 A | 9/1998 |
| NL | 9201751 | 5/1994 |
| WO | 02/058455 A1 | 8/2002 |
| WO | 02/100159 A2 | 12/2002 |

OTHER PUBLICATIONS

U.S. Appl. No. 60/276,874, entitled "Automated Plant Transplanting System", filed Mar. 14, 2001.

U.S. Appl. No. 60/273,420, entitled "Coordinated Plant Transplanting System", filed Mar. 5, 2001.

U.S. Appl. No. 60/296,915, entitled "Operational System for Transplanting Growing Plants", filed Jun. 8, 2001.

International Search Report, PCT/US02/02257, mailed Jun. 11, 2002, International Filing Date Jan. 24, 2002, Priority Date Jan. 24, 2001.

International Preliminary Examination Report, PCT/US02/02257, International Filing Date Jan. 24, 2002, Priority Date Jan. 24, 2001; completion date Oct. 22, 2002.

International Search Report mailed Mar. 2, 2005 for PCT/US04/09308 Filed Mar. 26, 2004.

Written Opinion of the International Searching Authority for PCT/US2004/009308, the parent international application, dated Mar. 2, 2005.

International Preliminary Report on Patentability for PCT/US2004/009308, the parent international application, dated Mar. 2, 2005.

\* cited by examiner

53

PLANT PUNCH METHODS AND APPARATUS

This application is a United States National Phase of, and claims priority to, International Application No. PCT/US2004/009308, filed 26 Mar. 2004, and published on 2 Nov. 2005, under International Publication Number WO 2005/102028 A1, said PCT application incorporated herein by reference. This application is also a continuation-in-part of, and claims priority to, application. Ser. No. 10/470,282, filed Jul. 24, 2003, now issued as U.S. Pat. No. 6,779,300, which is the US National Phase of PCT/US02/02257, filed Jan. 24, 2002, which itself claims priority to U.S. Provisional App. No. 60/296,915, filed Jun. 8, 2001, U.S. Provisional App. No. 60/276,874, filed Mar. 14, 2001, U.S. Provisional App. No. 60/273,420, filed Mar. 5, 2001, and U.S. Provisional App. No. 60/263,802, filed Jan. 24, 2001. This application also is a continuation-in-part of, and claims priority to, U.S. application Ser. No. 10/167,693, filed Jun. 10, 2002, now issued as U.S. Pat. No. 6,915,607, which itself claims priority to U.S. Provisional App. No. 60/296,915, filed Jun. 8, 2001.

TECHNICAL FIELD

Generally, this invention relates to plant punching methods and apparatus that improve transplant yield by reducing physical stress experienced by a plant during a plant transplant punch event. More specifically, at least one embodiment of the invention focuses on imparting a horizontally shifting motion to a plant punch element during a plant punch cycle so as to reduce contact of the plant punching parts with the plant. Aspects of the inventive technology also address a sheltering plant punch apparatus that can also reduce injury and stress experienced by the plant while it is punched.

BACKGROUND

There has long been a desire to transplants plants from a first container to a second container so that plant growth may continue, plant health may be enhanced, the plant may be re-established in a container that is more appropriate for sale to consumers and that enables or enhances plant growth to an optimally marketable size and condition, or for other reasons. More specifically, often the plant that is to be transplanted is a propagule that has spent at least some time growing in a container (or cell) of what may be referred to as a propagule tray, the term tray including a multi-celled arrangement for containing plants. Such a propagule tray typically contains several cells in most or all of which one or more propagules is established. For certain reasons (e.g., because production efficiency is enhanced and production costs are lowered), the propagule is, at some point in its early life (e.g., as a seed) established and in and allowed to grow in a container (again, a cell) that is smaller (volumetrically and areally, e.g.) than the container in which it is ultimately presented during sale to the consumer (the larger container may be referred to as a cell of an adolescent tray). Thus, there must be a transplant event in order to re-plant or re-establish the plant (e.g., the propagule) from the cell of the propagule tray to the cell of the adolescent tray.

For quite a while now, many greenhouses have been relying on a plant punch achieved through the use of a plant punch machine to cause a plant transplant, whether it be for the reason indicated above or other reasons. Typically, a tray with larger cells (e.g., an adolescent tray) that contain soil is placed below a tray with smaller cells, at least some of which contain soil and one or more plants (e.g., propagules). Upon correctly positioning the two trays relative to each other, a plant punch may be caused to transplant one or more plants of the smaller cells of the upper tray into the larger cells of the lower tray. An actual, individual punch may be caused by a plant punch element (having a plant punch head) that has a lower surface that acts to apply a downward force from above the plant to be punched so that it is forceably removed from its smaller cell and re-located downwardly and into the soil of a larger cell of the lower tray. The plant punch element may then be brought back up to an upper position, establishing a plant punch cycle. Typically, more than one plant is punched at a time—e.g., more than one of the containers of the lower tray may be filled during one cycle of the plant punch apparatus (which, of course, would typically move more than one plant punch element). It should also be understood that more than one lower tray may be transplanted into during a plant punch cycle, although typically only one tray is established below the upper tray at one time. For purposes of clarity, this discussion will focus on the case where only one tray at a time is established below the upper tray.

After the plant is transplanted in the below-established tray, any of several events may take place. If the plant punch cycle effected a transplant of all the plants that it was desired to transplant into that tray, (e.g., perhaps all the cells of the below-established tray had a plant transplanted into them), then the lower tray may be removed from below the upper tray and replaced with a tray into which it is desired to transplant at least one plant from the upper tray. However, it may be that the plant punch (a term that may refer individually to one plant punch or collectively to a plurality of punches that transplant more than one plant during one cycle) does not transplant a plant into each cell of the lower tray—if it is desired to fill all the cells of the lower tray, then the lower tray is not replaced after one cycle, but instead the lower tray and the plant punch element(s) may be adequately horizontally moved relative to each other so at least some of the "unfilled" (a term used to refer merely to the absence of a plant) cell(s) of the lower tray can be filled (e.g., have a plant transplanted into them) during an additional plant punch cycle. After as many plants are transplanted into the lower tray as desired, the lower tray may be replaced so that a different tray may be Of course, if more than one plant is to be punched during one cycle, then it is necessary that the plant punch apparatus have more than one plant punch element (as, typically, only one plant is punched per plant punch element during one plant punch cycle). As is well known in the art, regardless of whether all of the plants that it is desired to transplant into the lower tray are transplanted in one plant punch cycle, it is necessary to horizontally move the plant punch element(s) relative to the upper tray after one plant punch cycle in order to punch additional plants from the upper tray during an additional cycle. Although this is typically occurs by adequately horizontally moving the upper tray (e.g., in an indexing fashion) without moving the plant punch element(s), it may be also be achieved by adequately horizontally moving the plant punch element(s).

Although the basic plant punch method has evolved over several years, there are still problems that plague its implementation to transplant plants. Among these problems is physical damage of the plant inflicted during the plant punch. (or a lower surface of it) because the known method described immediately above also involves the step of forceably lowering the plant punch element directly onto the plant in order to effect the transplant of that plant. When the plant punch element descends directly on the plant, surfaces of the plant punch (including but not limited to its lower surface) directly contact parts of the plant, first contacting the upper portion of the plant and then the soil emerging plant structure (e.g., one or more stems) that emerge from the soil of the plant and support the plant's upper portions. Even though at times the surfaces of the plant punch element (including, importantly, a lower surface) might not directly contact a part of the plant (e.g., where the stem of a plant is separated during the punch event from the lower surface of the plant punch element by the upper portions of the plant that are sandwiched in between), that part of the plant could still be damaged because of the force applied indirectly to it. Further damage to plant parts (especially upper, leafy parts of the plant) may be caused not necessarily from the plant punch element, but instead from the soil in which the plant to be punched was initially established, as amounts of this soil that surround that soil that is punched downward may collapse into the upper portions of the plant during the plant punch and drag against the upper portions of the plant as they are moved downward. These two types of plant damage—whether resulting from the plant punch element as it is pressured against the plant to effect the downward re-positioning of the plant, or resulting from the "drag" of plant parts against soil of the upper tray's cell during the plant punch—individually and collectively can kill the plant, injure the plant, compromise the plant's ability to survive the stressful transplant and/or compromise the plant's growth after the plant punch, as but a few problems. Also, the approach described immediately above can cause a re-alignment of the plant to a misaligned position during the plant punch, with a resultant inadequately established transplanted plant. Each of these potential results attributable to known methods can cause a reduction in operational and production efficiency; higher production costs; and an overall decrease in greenhouse output and ability to meet consumer demand. The inventive technology disclosed and claimed herein seeks to alleviate or eliminate some or all of these problems.

DISCLOSURE OF INVENTION

The present invention includes a variety of aspects which may be selected in different combinations based upon the particular application or needs to be addressed. In one basic form, the invention discloses the use of apparatus and methods relative to horizontally shifting a plant punch element in towards a vertical axis defined by a plant emergent point while the plant punch element is traveling downwards towards plant growth medium in which the plant to be punched is established. The invention also discloses plant punch apparatus (and associated methods) that can be used to shelter at least portions of a plant while it is punched, thus reducing stress experienced by the plant during the plant punch, as compared with conventional plant punching technologies. It should be noted that aspects of the inventive technology described immediately above can be combined. Indeed, a high degree of protection and a clean and effective plant punch results when a shifting apparatus uses the sheltering plant punch apparatus to punch plants. Naturally, as a result of these different and potentially independent aspects of the inventive technology, the objects of the inventive technology are quite varied.

One of the broad objects of at least one embodiment of the inventive technology is the improvement of transplant yield by reducing the number of plants that are injured, destroyed, not transplanted as intended, or merely suffer such a degree of stress that their further growth is inhibited, impaired, or compromised.

Another broad object of at least one embodiment of the inventive technology is the reduction in cost associated with the transplant operation. This reduction in cost may result from the above-mentioned improvement in transplant yield, and an improvement in the predictability and certainty of transplant yield, future plant stocks and current plant needs to produce a certain transplanted output.

Naturally, further objects of the invention are disclosed throughout other areas of the specification and claims.

BRIEF DESCRIPTION OF DRAWINGS

It should be understood that the figures show merely a few different examples of embodiments of the invention and thus should not be construed as limiting the scope of the inventive technology.

MODES FOR CARRYING OUT THE INVENTION

Figure 1:
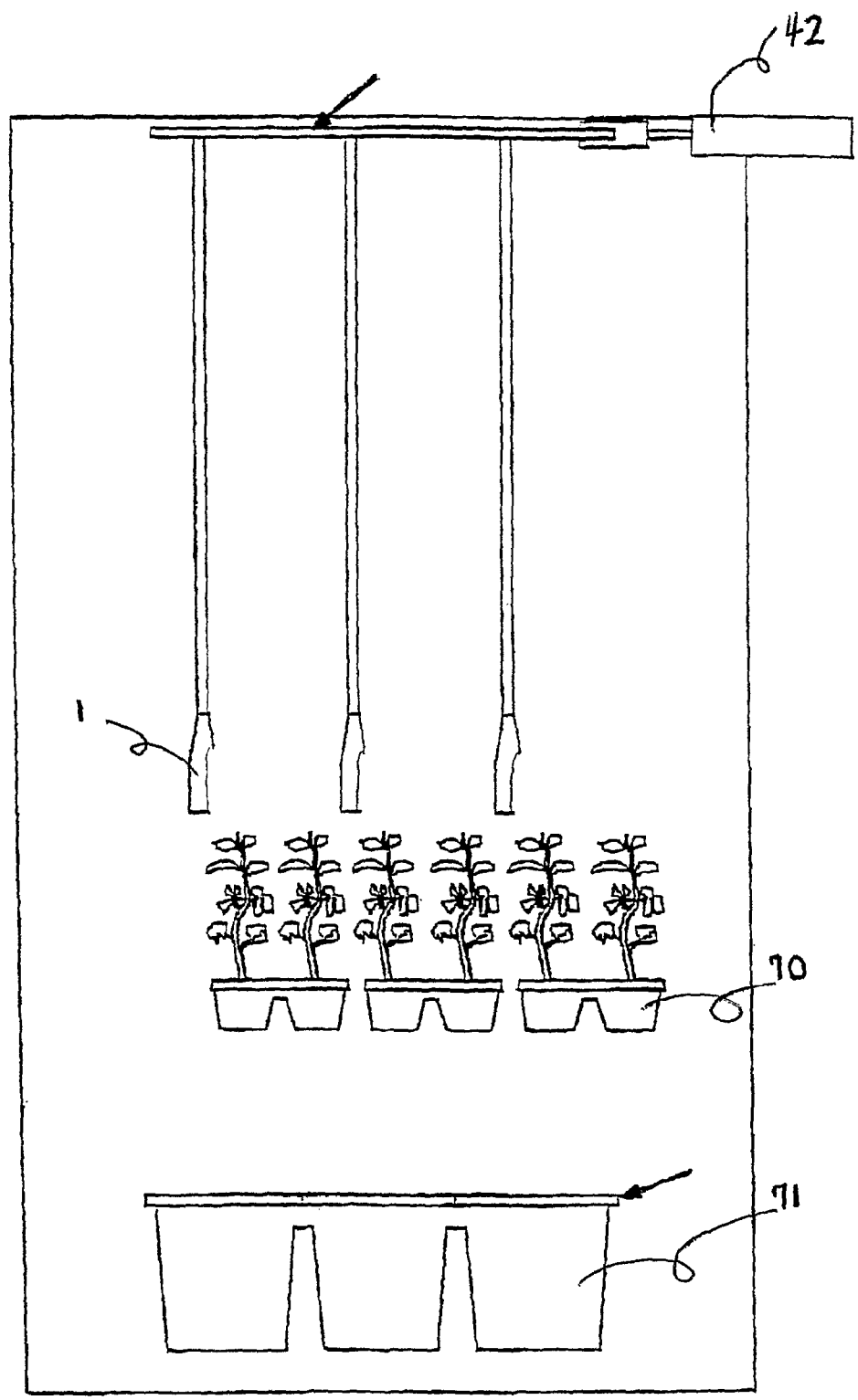
FIG. 1 shows a diagram of part during an initial stage of the plant punch cycle of the inventive shifting plant punch apparatus where the flat, pots, or plug tray (or upper tray, or propagule tray) and punch plate are in a start or home position. The plug tray and the punch plate heights may be adjustable depending on plant height.
Figure 2:
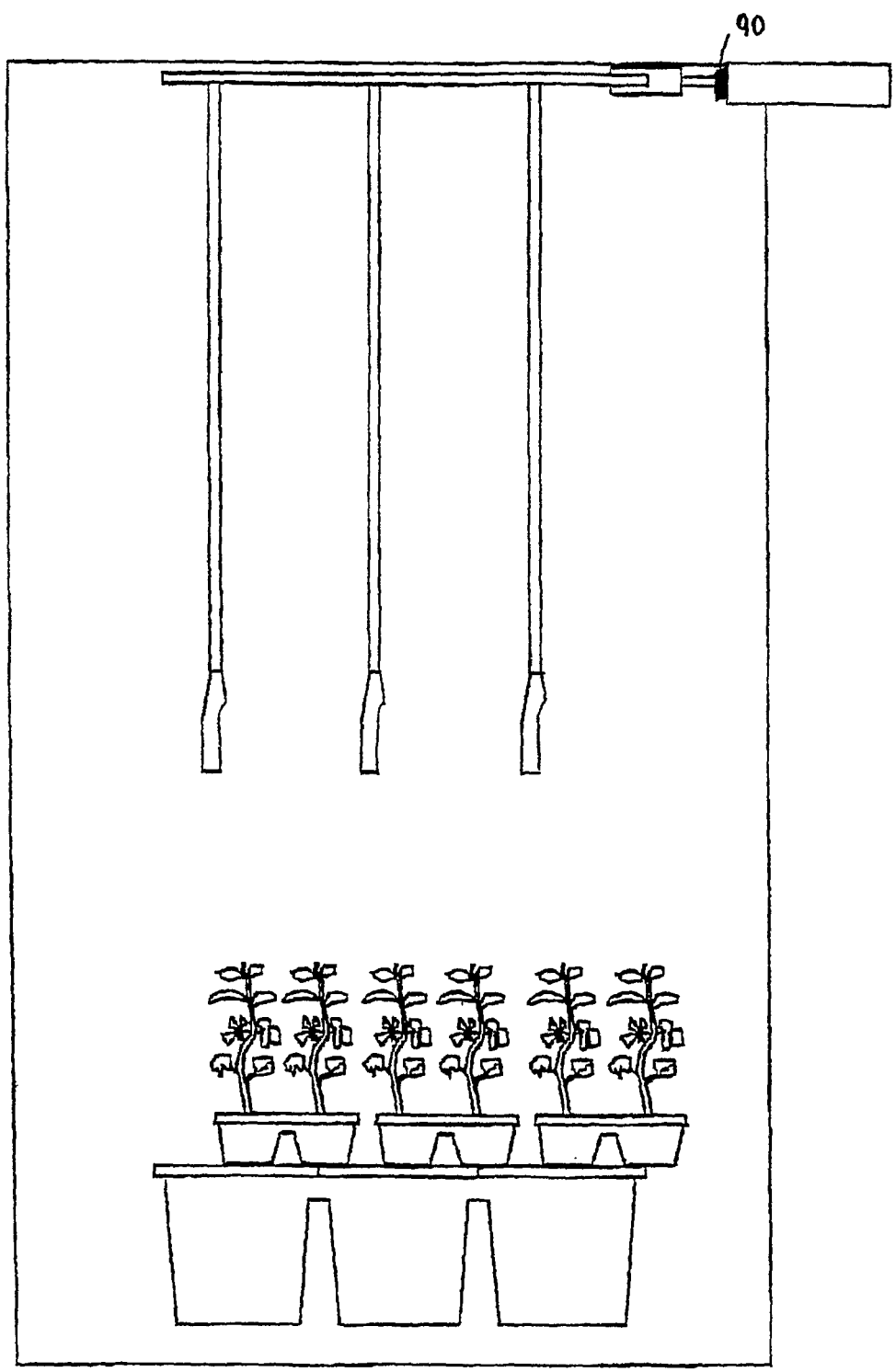
FIG. 2 shows a diagram of part during a subsequent stage of the plant punch cycle of the inventive shifting plant punch apparatus. Particularly, it can be noticed that the plug tray rack with plants has been lowered to meet the flats or pots.

As mentioned earlier, the present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should further be understood to support and encompass descriptions and claims of all the various embodiments, systems, techniques, methods, devices, and applications with any number of the disclosed elements, with each element alone, and also with any and all various permutations and combinations of all elements in this or any subsequent application. It should also be understood that the figure element numbers point to examples of the specified figure element, and thus should not be construed as limiting, but merely examples.

In at least one embodiment of the invention, a plant punch apparatus may comprise: a first plant punch element (1) that comprises a first plant punch head (50); a plant punch element movement mechanism (2) that is operable to move the first plant punch element through a plurality of spatial points that defines a first plant punch element travel path (3); and a frame (4) that supports the plant punch element movement mechanism. The plurality of spatial points may comprise a first spatial point (5) having a first horizontal distance (6) from a vertical spatial axis (7) defined by a first plant emergent point (8), where the first plant emergent point is defined by a site (9) at which a first plant emerges from plant growth media (10) in which it is established before it is punched from its container (11) during a plant punch event, and where the first plant emergent point defines a plant emergent point horizontal plane (12). The plurality of spatial points may further comprise a second spatial point (13) that: defines a second horizontal plane (14) that is below the first spatial point and above the plant emergent point horizontal plane, and has a second horizontal distance (15) from the vertical spatial axis. In preferred embodiments, the first horizontal distance is greater than the second horizontal distance and the first plant punch element travel path intersects and passes through and below the plant emergent point horizontal plane; this relative change in distance may reflect a "shift". Also, in preferred embodiments the first plant punch element travel path has a vertical component (16) at its intersection with the plant emergent point horizontal plane, and at some point from the first spatial point to the second spatial point of the first plant punch element travel path, the first plant punch element travel path has a horizontal component (17).

Inventive method embodiments include a novel plant punch method that may comprise the steps of: moving a first plant punch element that comprises a plant punch head from a first spatial point to a second spatial point that is lower than the first spatial point, wherein the first spatial point and the second spatial point partially define a first plant punch element travel path, where the first spatial point has a first horizontal distance from a vertical spatial axis that defines a first plant emergent point, and wherein the first plant emergent point is defined by the site at which a first plant emerges from plant growth media in which it is established before it is punched from its container during a plant punch event. The second spatial point may have a second horizontal distance from the vertical spatial axis, and the first horizontal distance may be greater than the second horizontal distance. These method embodiments may further comprise the steps of moving the first plant punch element through a plant emergent point horizontal plane defined by the first plant emergent point so as to punch the first plant from its container (which step requires only that at least a lower portion of the plant punch element moves passes beyond the plant emergent point horizontal plane); punching the first plant from its container; reaching a lowest first plant punch element position; and returning the first plant punch element to the first spatial point. The step of returning the first plant punch element may comprise completing a plant punch cycle (18).

In yet another aspect of the inventive technology, a plant punch method may comprise the steps of moving a plant punch element that comprises a plant punch head downwards from a first position (19); and moving the plant punch element in towards a vertical spatial axis defined by a first plant emergent point, wherein the first plant emergent point is defined by the site at which a plant emerges from plant growth media in which it is established before it is punched from its container during a plant punch event. The method embodiments may further comprise the steps of punching the plant with the plant punch element to cause a plant punch event; and returning the plant punch element to the first position.

At least one embodiment of the inventive technology may be a plant punch method that comprises the steps of: establishing a plant punch element (that comprises a plant punch head) in a first position that is outside of a sensitive vegetation profile (20) defined by plant punch sensitive vegetative parts (21) of an upper portion of a first plant (51), moving the plant punch element to have a downward component of motion (22) while maintaining the plant punch head outside of the sensitive vegetation profile; moving the plant punch head to a point below the sensitive vegetation profile; moving the plant punch head inwardly towards a central stem that supports the plant punch sensitive vegetative parts; punching the plant with the plant punch element; and returning the plant punch element to the first position. Of course, this and other methods may comprise the step of transplanting one or more plants (e.g., into one or more containers of a lower tray or pots, or perhaps even into a ground below).

Moving the first plant punch element (or any plant punch element (23) for that matter) to have a vertical component of motion or a horizontal component of motion may be accomplished in many ways (e.g., manually, electromagnetically, pneumatically or hydraulically, to name a few). These motions may also be initiated, actuated or effected automatically, semi-automatically (e.g., by pushing a button (24) to start each instance of the specified motion), or manually. "Operable to move" may include parts that attach the referenced element (even, perhaps, removably, as where magnets are used, e.g.), or connect them in some fashion.

It should be understood that the first plant punch element may be one of several plant punch elements, each of which may be used as part of a plant punch machine (25), to punch a plant. Indeed, in a preferred embodiment, additional plant punch elements (23) may be moved by the plant punch element movement mechanism through additional, respective plant punch element travel paths (26) to punch additional, respective plants (27) (e.g., a nominal $6^{th}$ (or $n^{th}$) plant punch element may travel through a $6^{th}$ (or $n^{th}$) plant punch travel path to punch a $6^{th}$ (or $n^{th}$) plant). These additional travel paths may be horizontally offset from the first plant punch travel path, and also may be spatially oriented relative to their respective plant in the same way that the first plant punch element travel path is spatially oriented relative to the first plant (e.g., they may all initiate a horizontal shift above their respective plants at the same height above the underlying soil (or more broadly, plant growth medium) and at the same horizontal distance from their respective plant). It may be the that, in some embodiments, the additional travel paths mimic the first plant punch travel path in parallel fashion.

A set of plant punch elements may be established in a row by column arrangement, or in any arrangement or pattern and may be held by a plant punch pin plate (28) (or a plant punch element plate). The arrangement or pattern may accommodate constraints set by the specific punch (e.g., constraints set by the dimensions of the lower tray). However, it should be noted that plant punch machines that have only one or a very few plant punch elements and are thus usable to punch only one or a very few plants at any one time are indeed feasible and intended as covered by at least some of the claims.

The plant punch head may refer to that part or structure that is sufficiently rigid by itself (e.g., without any plant punch body that may be above it) to apply from one or more of its surfaces (e.g., a lower surface) a force sufficient to displace or dislodge a plant during a plant punch event. It should be understood that if a plant punch element is able to punch a plant, it has a plant punch head; the plant punch body, where it exists, is more directed to sheltering and protecting the plant from harm during the plant punch event. In some embodiments, again, particularly where "sheltering" of the plant during the plant punch is desired, the plant punch element may further comprise a plant punch body (29) established above the plant punch head. It should also be noted that a plant to be punched may have more than one stem (30). Thus, in order to define a single plant emergent point relative to plants having more than one stem emerging from the plant growth media (e.g., soil), a site (e.g., an area) defined by the plurality of points where the individual stems emerge from the plant growth medium (e.g., if there were two such points, the site would be a line; if there were three, it would be a triangle) is used to define that single plant emergent point that is used to define the vertical spatial axis. Simply, the centroid of such multi-stemmed sites could be that single point. Of course, where the plant to be punched is only single stemmed, then the point where that plant emerges from the ground is the site and the plant emergent point.

It should also be noted that, as is apparent from FIGS. 8-13, motion of the plant punch element along its plant punch element travel path may, at any point, be purely horizontal, purely vertical, or a combination of horizontal and vertical (e.g., diagonal, where it has a horizontal and vertical component simultaneously), whether straight or curved. It should be understood that a plant punch element that is moving purely vertically is also deemed to have a vertical component of movement (but not a horizontal component) and that a plant punch element that is moving purely horizontally is also deemed to have a horizontal component of movement (but not a vertical component). Substantially vertical motion is broader than pure vertical motion in that it also includes those motions where there is small but effectively negligible horizontal motion.

It may be helpful to point out that the plant emergent point horizontal plane is deemed to remain as initially oriented even after the plant punch. Further, it should also be noted that the term plant is a broad term that includes propagule; vegetative matter capable of growing; vegetative tissue capable of growing; vegetative or plant explants; and vegetative or plant substance or matter used in tissue culturing, as but a few examples. Plant growth medium should also be understood as including not only soil and fertilizer (whether natural or synthetic), but also any medium (including synthetic substances such as used in plant tissue culturing) in which a plant, as broadly defined, can grow.

The plant punch element travel path and how it may relate to the plant also deserves discussion. The plant may have upper vegetation (e.g., leafy portions) that has a mean vegetative horizontal distance (31) from the vertical spatial axis, and the first horizontal distance may be greater than this mean vegetative horizontal distance. An upper portion of the plant may have plant punch sensitive vegetative parts (32) that define a sensitive vegetation profile (20) in a plane defined by the first spatial point and the plant emergent point (or by the first and second spatial points), and the plant punch element travel path may be outside one side of the sensitive vegetation profile. The actual shift of the plant punch element may be effected perhaps after a lower surface of the downwardly moving plant punch element has reached a certain height position, e.g., a position that is lower than a certain upper portion of the plant that is sensitive to the punch (e.g., that may be easily harmed by the downwardly moving plant punch element). In this way, during the an initial portion of the downward movement of the plant punch element from the home position, the lower surface of the plant punch element can avoid contact with parts of the plant (e.g., upper parts) that might be harmed by such contact.

Some embodiments of the inventive technology feature adjustment capabilities (see, (90), (91), e.g.). For example, the plant punch element may initiate a horizontal motion at a horizontal motion initiation point (33) that is located on the plant punch travel path somewhere between the first spatial point and the second spatial point, and this horizontal motion initiation point may have a horizontal motion initiation height (34) above the plant emergent point horizontal plane, which height may be adjustable. The horizontal motion initiation point may also have a horizontal motion initiation width (35) that is equal to a horizontal distance of the horizontal motion initiation point from the vertical spatial axis, which width may be adjustable. Generally, the horizontal component (e.g., a horizontal motion component) of the plant punch element travel path may have a horizontal motion initiation point between the first and second spatial points, and this horizontal motion initiation point may be spatially adjustable. The speed and angle of the shift may be adjustable, said adjustment depending perhaps on the plant variety and size. It may also be the that the plant punch element movement mechanism is operable to effect an adjustable horizontal travel distance (35) of the plant punch element. Further, the planting depth (e.g., the extent to which the lower surface of the plant punch head penetrates below the plant emergent point horizontal plane to transplant a plant into a lower container may be adjustable). Steps that are corollary to the above may include the steps of initiating a horizontal motion at a horizontal motion initiation height and width, and adjusting either or both of this height and width. Of course, the step of initiating a horizontal motion can be the initiation of a plant punch element motion that is not only purely horizontal, but it also can be the initiation a simultaneous horizontal and vertical plant punch motion where the plant punch element has a horizontal component of motion (e.g., diagonally)).

There are a many ways in which a plant punch element may return to a first spatial point, which point itself may be, e.g., an upper, home position, or highest point or position during a plant punch cycle (of course, this and all indications as to distance, height and travel path presume a consistent reference measuring point on the plant punch element). The plant punch element may retrace its downward path (36) during its return path (95) (the step of returning the plant punch element to the first spatial point only after returning it to the second spatial point may effect such a "retracing" return path), or it may take any one of innumerable return paths that are in some way different from the downward path. It may be that certain return paths lend themselves to simpler plant punch element movement mechanism designs (e.g., where the return path mimics or retraces the downward path, or where the return path is substantially along the vertical spatial axis until a certain height at which point it is moved over (and perhaps up) to its first spatial or home position). The step of returning a plant punch element to the first spatial point may comprise the step of vertically moving the plant punch element such that substantially at least one third of its travel from the lowest plant punch element position to the first spatial point is along the vertical spatial axis (see, e.g., FIGS. 8 and 10).

The plurality of spatial points that define the plant punch element travel path may comprise a third spatial point (37) that is substantially co-incident with the plant emergent point, meaning that the plant punch element may initiate penetration of the plant punch media of a container of the upper tray during the actual plant punch at substantially the plant emergent point. However, in certain situations, it may be desirable to initiate penetration of the plant growth medium at a point other than the plant emergent point.

It should be noted that the plurality of spatial points may define the plant punch element travel path by defining a curve (which may include a line) through which a point itself defined by the plant punch head (particularly, by a lower surface of it, such as a downward plant punch force application surface (38)) travels. This point could be the centroid (39) or center of that lower surface. Of course, where the lower surface is, e.g., annular or partially so, the centroid would likely be off the surface. Thus, when it is stated that the plant punch element travel path may comprise a third spatial point that is substantially co-incident with the plant emergent point, this does not mean that the lower surface of the plant punch head contacts that point (or the stem that may define that point). Indeed, a focus of embodiments of this invention is to avoid such contact, thereby precluding injury to and stress experienced by the plant during the actual punch. Where the lower surface is not entirely flat, then a vertical projection of that lower surface onto an imaginary horizontal plane immediately below it would serve to establish an area whose centroid would define the point of the plant punch head that travels along the plant punch element travel path.

The plant punch element movement mechanism may be operable (even where it is entirely automatic) to generate a plant punch cycle. This cycle may be complete upon the return of the plant punch element to a first position, which may be a home position (39). Typically, one plant is punched per plant punch element during one cycle, but it certainly is feasible that more than one plant could be established in an individual container (or cell) of the upper tray or flat such that one plant punch element could punch them during a plant punch cycle.

Figure 12:
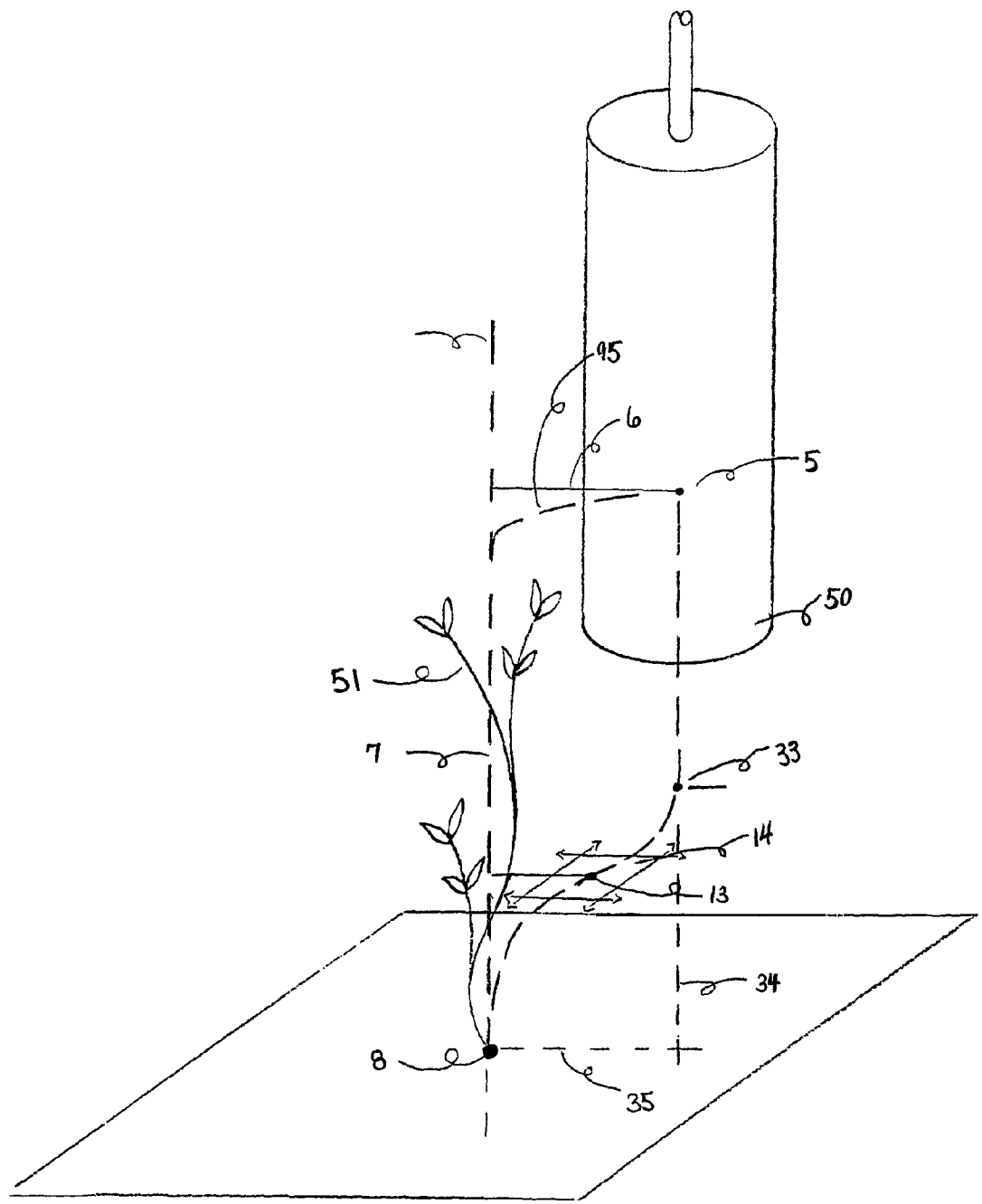
FIG. 12 shows a plant punch element travel path in relation to the plant to be punched, with a plant punch element in an intermediate position, of at least one embodiment of the invention.
Figure 13:
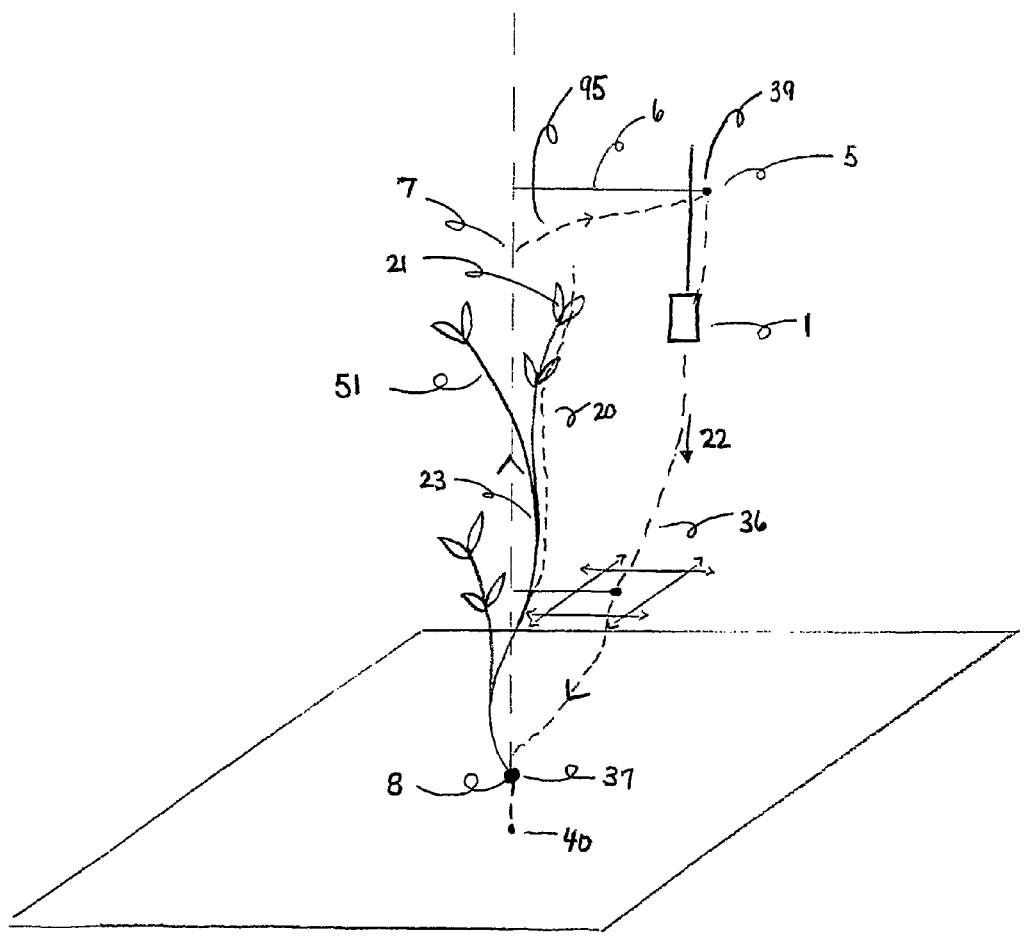
FIG. 13 shows a plant punch element travel path in relation to the plant to be punched, with a plant punch element in an intermediate position, of at least one embodiment of the invention.

FIGS. 8-13 show just a few of the wide variety of plant punch element travel paths that are part of the inventive technology. The plant punch element travel paths may involve downward punching paths to a lowest plant punch element position (40), and a plant punch element return path by which the plant punch element may return to a first spatial point (which may be a "home" position), thus completing a plant punch cycle. As in FIG. 9, for example, the plant punch element return path may be identical to its downward path, or, as shown in FIG. 12, the return path (or, e.g., an upper part thereof) may be different from its downward path. It should be noted (see, e.g., FIG. 8) that any plant punch element that has a gap (41) (e.g., a plant punch element gap) through which some portion of the plant (or perhaps the entire height of the plant) may be passed during the plant punch cycle may be used for optimal results. The portion of the plant (or perhaps all of it) would be passed through the gap during the "shift" so that the plant punch element would be substantially or partially about, or partially around a height portion of the plant (or perhaps all of the plant). In this way, sheltering (e.g., shrouding or protecting) of the plant (or the portion thereof) during the plant punch may be effected. Of course, this "passage" occurs when the plant punch element is moved to have at least some horizontal component of motion.

Figure 14A:
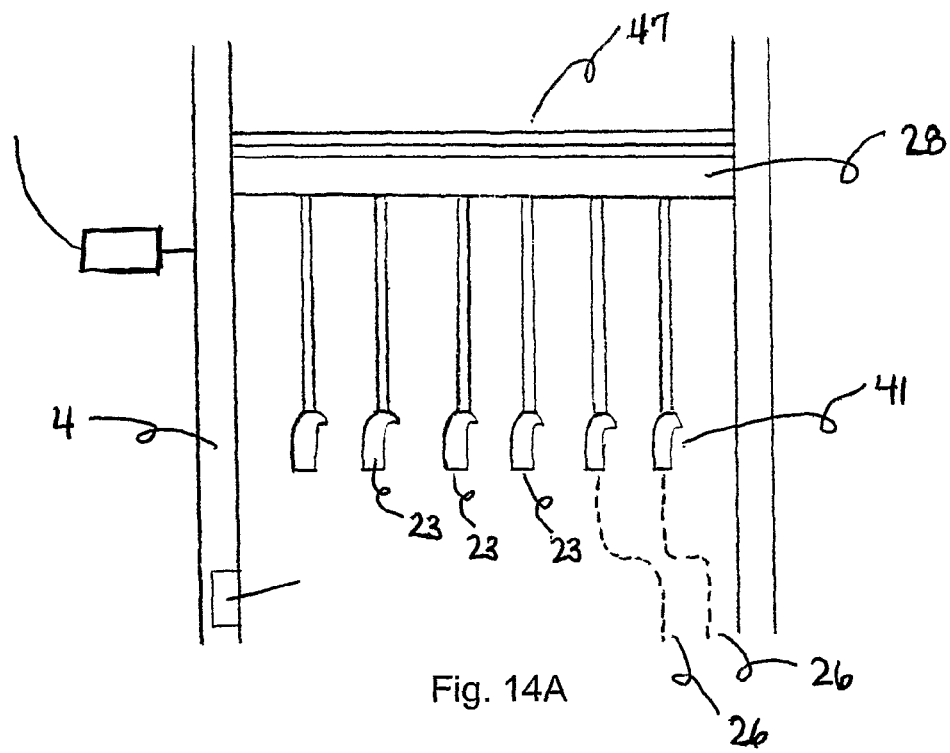
FIG. 14(a) shows a row of plant punch apparatus (in this instance, plant punch elements) with their plant punch heads, in addition to a punch element plate (e.g., a punch pin plate) that may retain all the punch pins, a punch element plate holder (e.g., a punch pin plate holder) that may allow for a pneumatic cylinder to horizontally shift the punch plate, and a part of a type of horizontal plant punch element movement mechanism (a pneumatic horizontal plant punch element movement mechanism that can move all punch elements at once by moving a plate (or its holder) with which they are connected).
Figure 14B:
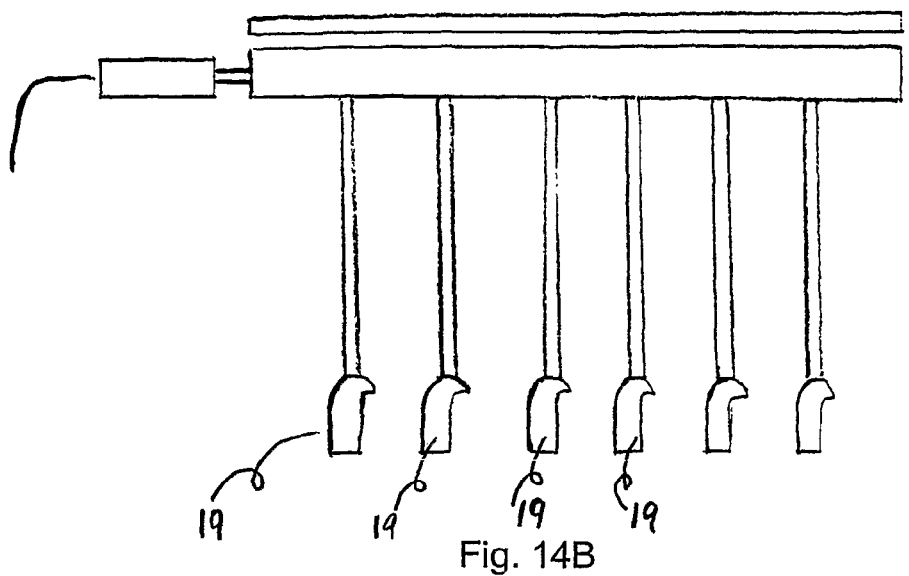
FIG. 14(b) shows a row of plant punch apparatus and their plant punch elements, in addition to a sensor (here, a switch), which may form part of the horizontal plant punch element movement mechanism, and that may be used to automatically activate the horizontal shift at a certain height.

Examples of plant punch element movement mechanism are shown in FIGS. 14(*a,b*), 15 and 31. It should be understood that there are many different ways of accomplishing the vertical and horizontal movements of the plant punch element (e.g., there are many different types of each the horizontal plant punch element movement mechanisms and the vertical plant punch element movement mechanism). For example, either or both may be automatic, semi-automatic (e.g., when a button is pressed, the desired motion occurs) or manual. Indeed, although the concept of "shifting" in the plant punching context is per se inventive, it is expected that a person with ordinary skill in the art of plant punch machines would, upon being presented this novel and inventive idea, be able to create designs to accomplish the novel motion, because it is well known in the art how one can accomplish such motion. Whether automatic or semi-automatic, the vertical and horizontal plant punch element movement mechanism (and indeed the entire plant punch element movement mechanism) could be pneumatic (and comprise a pneumatic cylinder (42), e.g.) or electromagnetic (e.g., using a servomotor), robotic or magnetic, or compressed fluid (e.g., hydraulic) to name a few of many well known manners of accomplishing the automatic or semi-automatic motion ((43) represents a generic movement mechanism). Where any of the movement mechanisms is manual (44), well known manners of mechanically translating a manually applied force to effect the desired movement (e.g., using belts, pulleys, chains, lever arms, bars, weights, guides or tracks) may be implemented.

Figure 15:
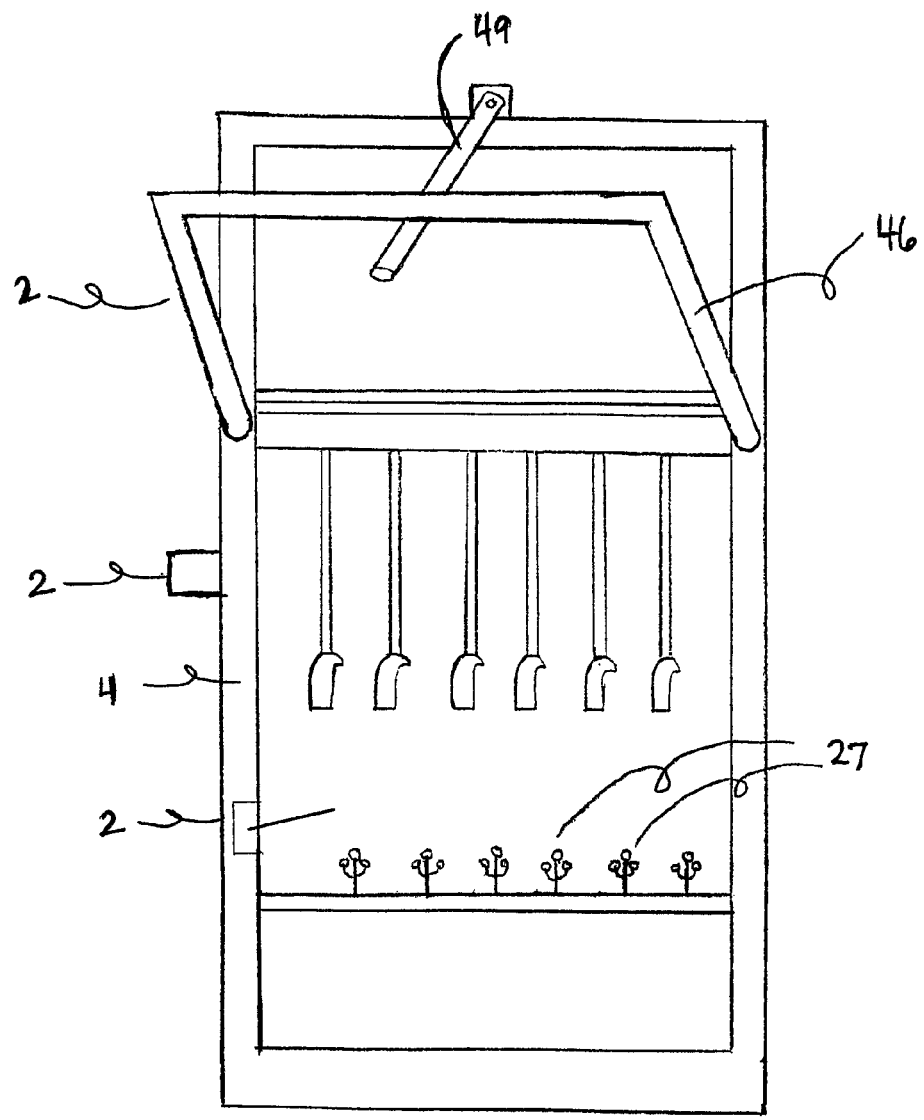
FIG. 15 shows a row of plant punch elements, in addition to plants to be punched from an upper tray, a vertical plant punch element movement mechanism, a finish tray (a lower tray into which the plants are to be transplanted), and a mechanism to move the upper tray vertically.
Figure 16A:
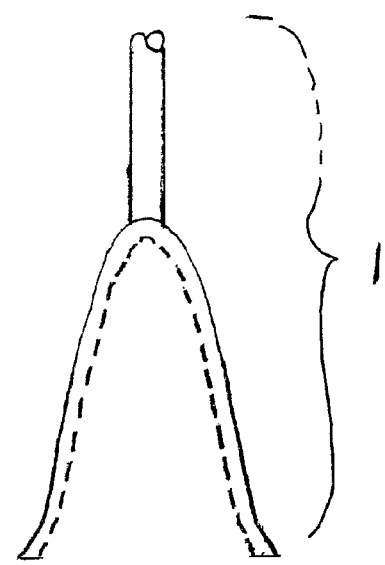
FIG. 16(a) shows an embodiment of a plant punch apparatus in cross-section view.
Figure 16B:
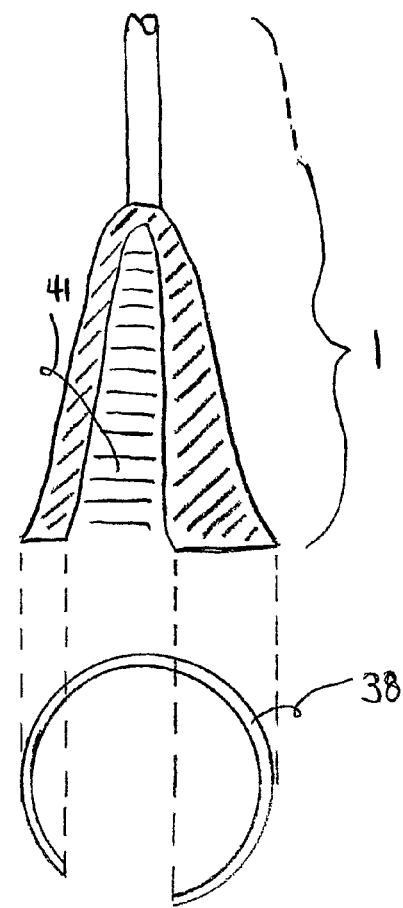
FIG. 16(b) shows an embodiment of a plant punch apparatus in side view with a projection view of its lower surface.
Figure 17A:
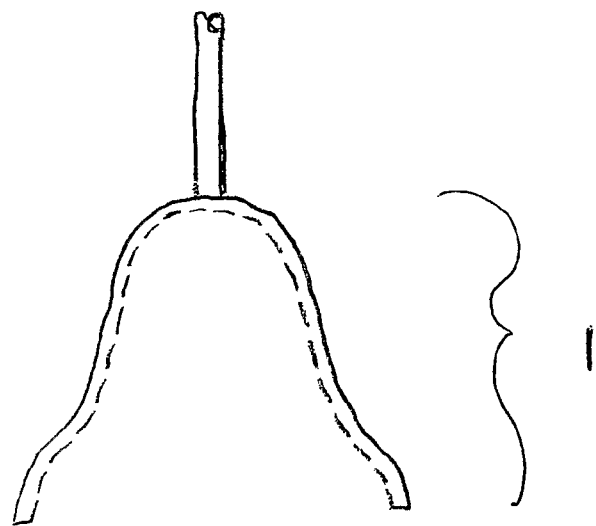
FIG. 17(a) shows an embodiment of a plant punch apparatus in cross-section view.
Figure 17B:
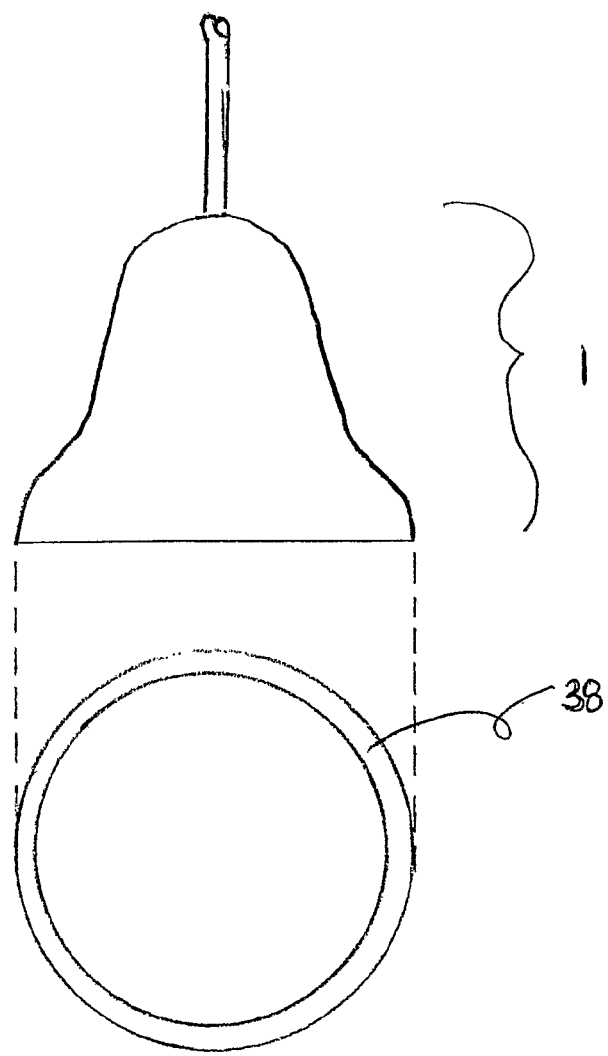
FIG. 17(b) shows an embodiment of a plant punch apparatus in side view with a projection view of its lower surface.

It should be noted that a horizontal plant punch element movement mechanism (45) is deemed to exist wherever a motion that has a horizontal component can be effected, and that a vertical plant punch element movement mechanism (46) is deemed to exist wherever there a motion that has a vertical component can be effected. FIG. 14(*b*) shows a side view of a portion of a pneumatic horizontal motion mechanism, and the punch element plate holder (47) and punch element plate that it may hold (the figure shows only a row of plant punch elements (and plant punch bodies)). FIGS. 14(*a*) and 31 show also a switch (48) by which the horizontal plant punch element movement apparatus can be automatically actuated (perhaps when part of the switch is physically moved by a part that descends with the plant punch element) to move one or more plant punch elements. FIG. 15 shows aspects of one embodiment of the plant punch element movement mechanism (in addition to the frame that may support it), including the vertical plant punch element movement mechanism and a mechanism (49) that is usable to move the upper tray vertically so that it may be positioned nearer to the lower tray during the plant punch, when appropriate.

Figure 31:
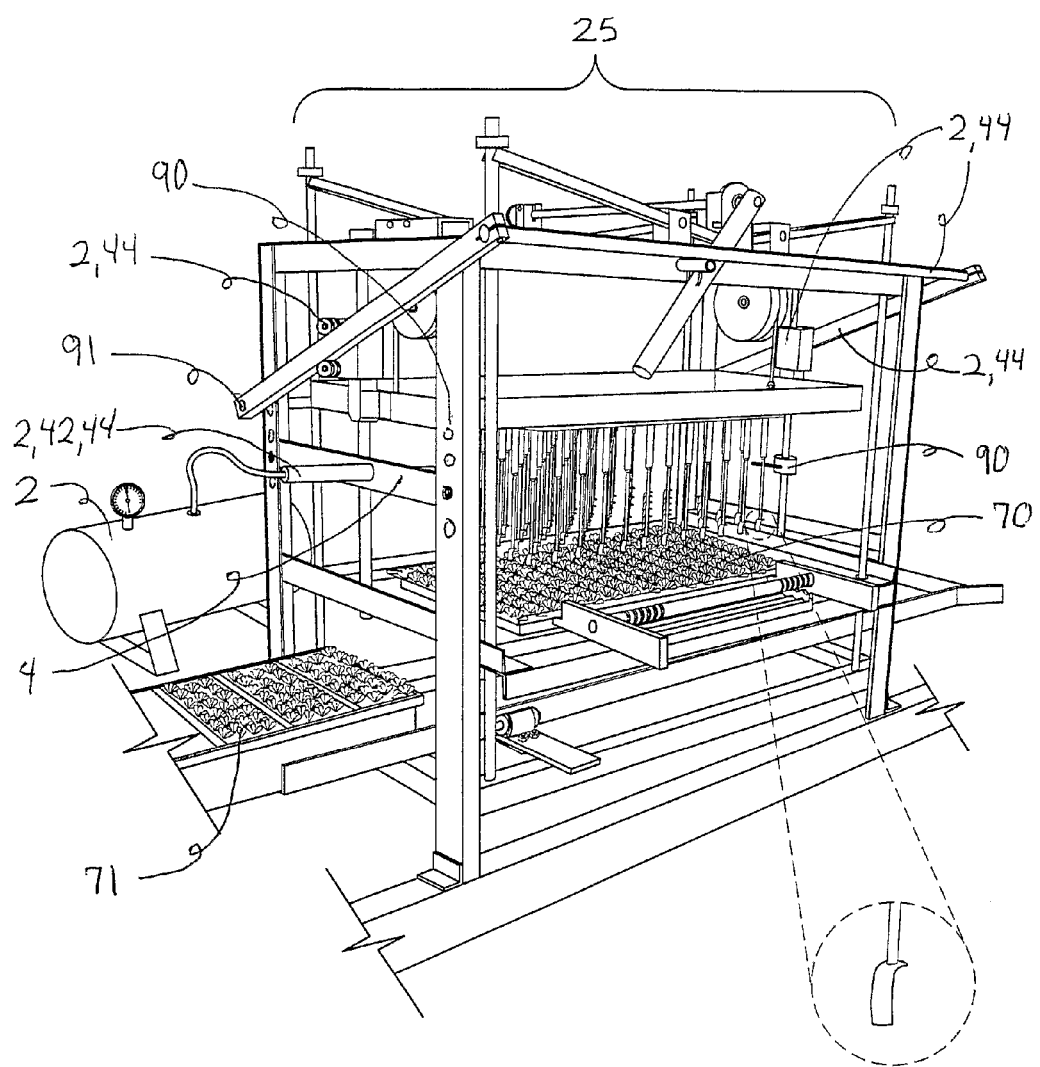
FIG. 31 shows a plant punch apparatus (here, a comprehensive plant punch machine) having automatic, pneumatic shifting capability, manual plant punch element movement mechanism and shrouding plant punch bodies.

FIG. 31 shows the plant punch element movement mechanism, and the frame that supports it, as part of a comprehensive plant punch machine (also referred to as a plant punch apparatus). FIG. 31 in particular shows the plant punch apparatus with upper and lower trays and the plant punch element movement mechanism, inter alia, where the plant punch element movement mechanism in this specific embodiment includes a horizontal plant punch element movement mechanism that is pneumatic and automatically triggered by a switch that is thrown when the plant punch element reaches a certain height. In the specific embodiment of FIG. 31, the vertical plant punch element movement mechanism is manual, but of course, as discussed above, other means of achieving motion (e.g., electromagnetic, hydraulic, pneumatic) are contemplated by the inventors, particularly where the referenced mechanism is automatic or semi-automatic. Further, in the specific embodiment of FIG. 31, the horizontal plant punch element movement mechanism is pneumatic, but of course, as discussed above, other means of achieving motion (e.g., electromagnetic, hydraulic, manual) are within the scope of the inventive technology.

FIGS. 16, 18, 19, 20, 22(*b* and *d*), 23(*b*), 27, 28, 29, and 30(*a,b*) are just a few examples of plant punch elements that may is particularly suited for use in a "shifting" plant punch machine (aspects of which are shown in FIGS. 1-15). As is apparent, some of these apparatus have plant punch bodies that can be used to shelter all or a part of the plant during the plant punch (see, e.g., FIGS. 16(*b*), 18, 19, 20 and 22(*b,d*)), and some do not (see, e.g., FIGS. 27, 28, 29 and 30 (*a, b*). Of course, these are just a few examples of the wide variety of shapes and sizes possible, which are represented generically by punch apparatus # in FIG. 8. All, however, have some sort of perimeter gap (53) (e.g., a gap in the perimeter of the apparatus or a plant punch element gap) that may allow access of the plant punch element (including a plant punch body if there is one) to a position around at least part of the plant.

It should also be understood that all motions expressed in the claims (e.g., moving the punch element) include, inter alia, relative motions that effect the specified type of motion. For example, the step of "moving the first plant punch element through a plant emergent point horizontal plane" may be effected not only by directly moving the first plant punch element, but also by moving the upper container (thus moving the plant emergent point horizontal plane) so that the first plant punch element moves through it this plane.

It should be noted that in preferred embodiments, the apparatus is designed to transplant plants into containers of trays or flats, or pots, that are positioned below the tray or flat or container(s) in which the plant to be punched is initially established. However, it may be that some embodiments find application in the transplanting of plants into the ground, perhaps from a machine while that machine moves along the ground. In such a case, the frame supporting the plant punch element movement mechanism would be moving (horizontally translating, as a motion superimposed on the cyclical motion of the plant punch element through its travel path). However, preferred embodiments do not involve transplanting into the ground using a moving machine, so in these embodiments, the frame supporting the plant punch element movement mechanism would likely not be moving (and there would not be any horizontal translating motion superimposed on the cyclical motion of the plant punch element through its travel path).

Another aspect of the invention is a plant punch apparatus that may comprise a plant punch head; and a downward plant punch force application surface (e.g., a lower surface of the plant punch head) that is adapted so that: during a plant punch event, and while the plant punch head is displaced downwardly against plant growth medium in which a plant to be punched during the plant punch event is established, and while the downward plant punch force application surface is positioned horizontally about a plant growth medium emerging plant structure (60), the downward plant punch force application surface displaces the plant without contacting the plant growth medium emerging plant structure. The downward plant punch force application surface has a horizontal cross section shape and size, and the plant growth medium emerging plant structure is that vegetative structure of the plant that emerges from the plant growth medium and supports upper vegetative portions of the plant (e.g., an upper one half, or perhaps that upper potion that has leaves). The apparatus may further comprise a plant punch body established above and perhaps contiguously with the plant punch head, where the plant punch body is adapted so that, while the plant punch head is displaced downwardly against plant growth medium in which the plant to be punched during the plant punch event is established, the plant punch body is at least partly around at least a one-third of height portion of the plant, perhaps so as to shelter the at least a one-third of height portion of the plant. The plant punch body may thus, in addition to the plant punch head, serve to protect or shelter parts of the plant during the plant punch event.

In yet another aspect of the invention, a plant punch method may comprise the steps of: forcing a downward plant punch force application surface of a plant punch head against an upper surface of plant growth medium in which a plant to be punched is established without contacting the downward plant punch force application surface with a plant growth medium emerging plant structure. The method may further comprise the steps of: punching the plant upon downwardly moving the downward plant punch force application surface during a plant punch, and sheltering at least a one-third of height portion of the plant during the plant punch while performing the step of punching the plant.

It should be noted that the term "sheltering" need not involve (and indeed in a preferred embodiment does not) entirely surrounding with some type of physical barrier. Instead, it merely involves establishing a barrier (e.g., the plant punch body) along the indicated height portion of the plant to be punched and around enough of the plant to protect it sufficiently during the plant punch. Such physical barrier may obstruct from the plant certain stresses that it might suffer when it folds as it is forced through an aperture at the bottom of the container of the upper tray during the plant punch. The preclusion of such contact (including shearing and sliding contact between plant growth medium and parts of the container) can significantly reduce the stress experienced by the plant during the plant punch, abate injury to the plant, result in a cleaner punch, and improve punched plant survivability and transplant yield. It should be noted that the plant punch element (with the plant punch head and the plant punch body) need not have a height that is greater than that of the plant that it is to punch, although in a preferred embodiment of the "closed top" design, it does.

Examples of the apparatus described immediately above (the "plant punch body comprising apparatus") and examples relative to the methods described immediately above are shown in FIGS. 16-23. In some figures, there is provided a vertical spatial gap (63) (or perimeter gap extended vertically along at least part of the plant punch body) (see, e.g., FIGS. 16(*b*), 18, 19, 20, 22(*b*), 22(*d*) and 23(*b*)), while in other figures, there is no such gap (see, e.g., FIGS. 17(*b*), 21, 22(*a,c*) and 23(*a*). Some apparatus may have be open-topped (see, e.g., FIGS. 22(*c,d*)), while others may be closed at the top (see, e.g., FIGS. 16-21, 22(*a,b*) and 23(*a,b*). It should be noted that this discussion and the figures are intended to disclose not only the apparatus as explicitly shown, but also the different permutations and combinations (e.g., FIG. 19 with an open top and an appropriately re-positioned stem (a type of downward force transmission element (80))). Those apparatus without a vertical, slot-like gap or perimeter gap extending along part of the plant punch body (see, e.g., FIGS. 17, 21, 22(*a,c*), 23(*a*), are particularly suited for use in the traditional, non-shifting plant punch machine (where the plant punch head is moved vertically up and down, and no horizontal "shifting" is effected). The plant punch apparatus of FIGS. 24, 25 and 26 may find particular application where a "sheltering" effect is not desired, and where a strictly vertically moving plant punch machine (i.e., a traditional punching machine) is used instead of the inventive "shifting" plant punch machine.

It should be noted that the plant punch body may establish an inner spatial void (65) that is sized to at least partially contain at least a one-third of height portion of the plant while the downward plant punch force application surface displaces or dislodges the plant (during the plant punch). The term "of height portion" is used to indicate that the portion that the specified qualifier is referring to is a portion of the height (e.g., as opposed to an arc portion (e.g., 120 degrees around the plant).

The downward plant punch force application surface is that lower surface (e.g., underside surface) of the plant punch head that applies a plant punch force to the plant growth media in order to dislodge that plant during the plant punch, where the plant punch force has a downward component. The lower surface may be horizontally flat (e.g., the bottom of a tube that has been cut perpendicularly to its longitudinal axis) or it may be angled relative to a horizontal plane (or it may reflect both types of surfaces), e.g.

Figure 18:
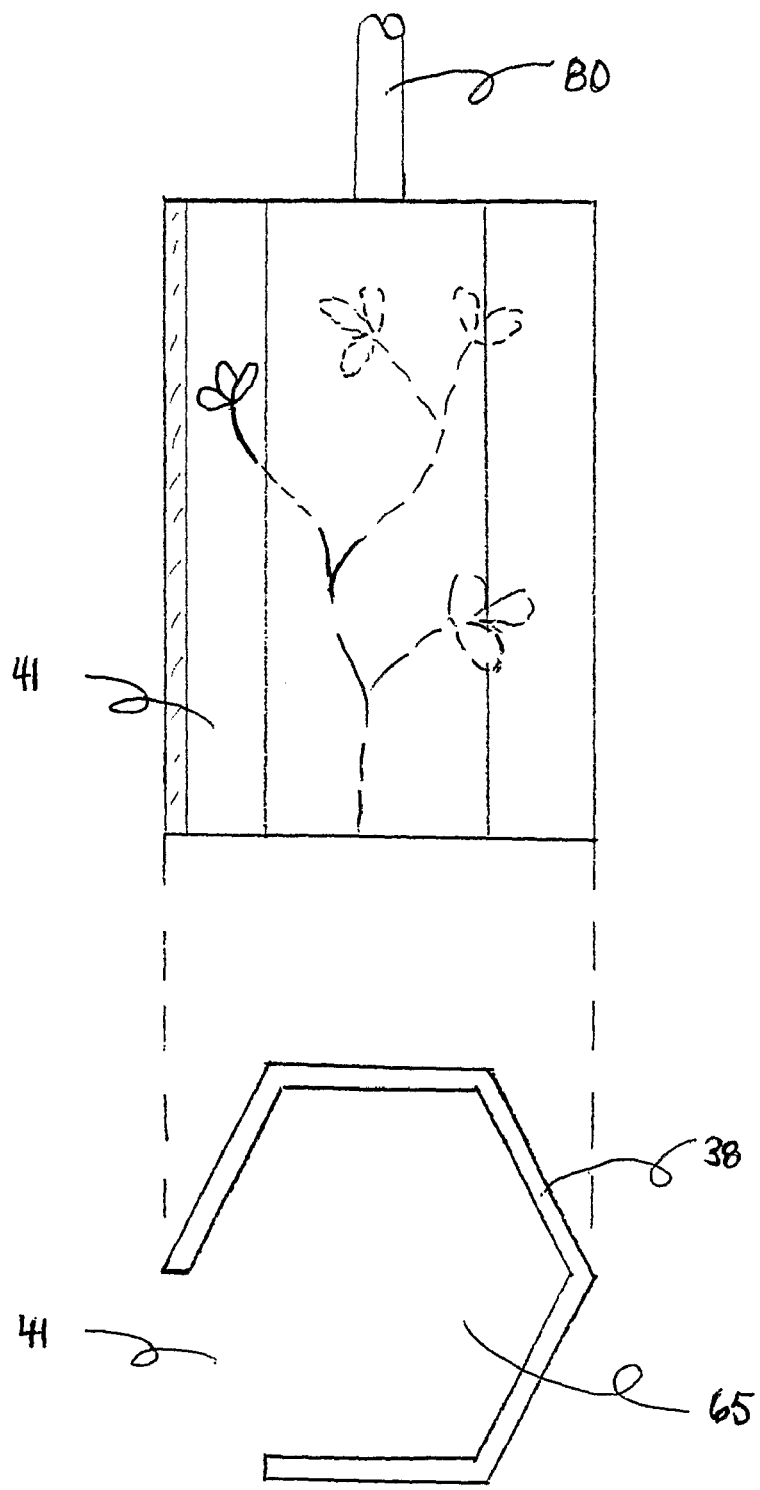
FIG. 18 shows an embodiment of a plant punch apparatus in side view with a projection view of its lower surface.
Figure 19:
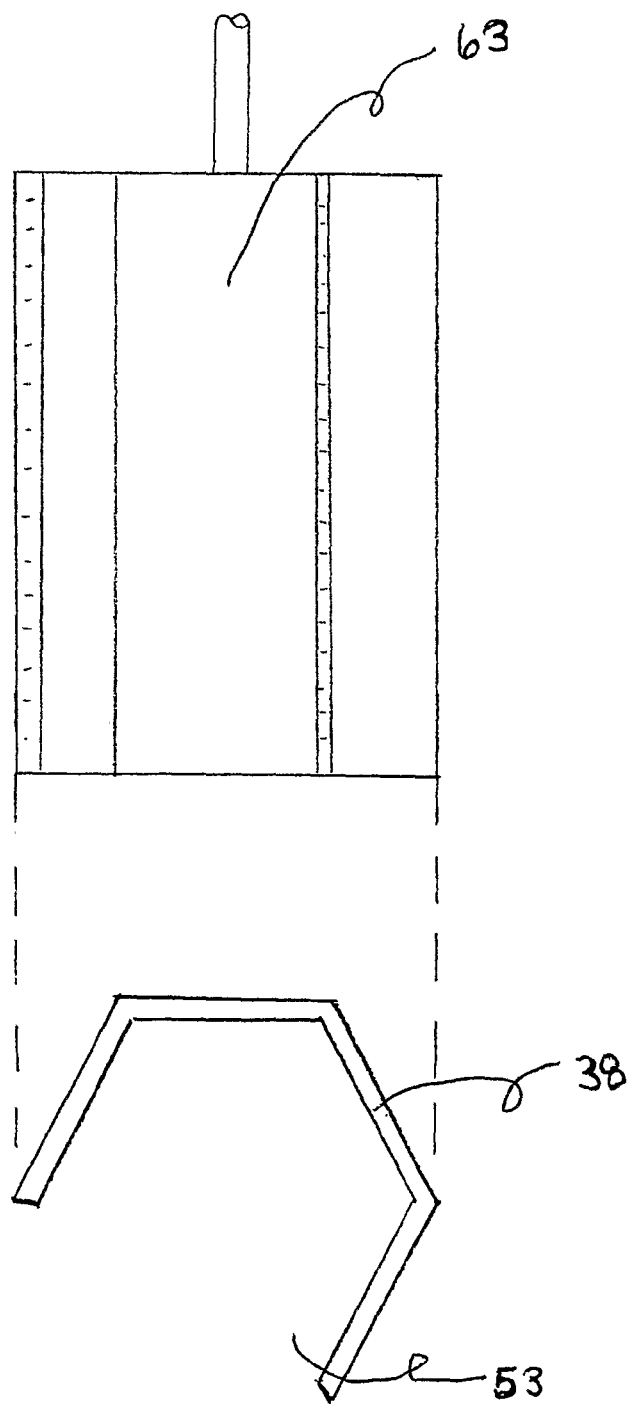
FIG. 19 shows an embodiment of a plant punch apparatus in side view with a projection view of its lower surface.
Figure 20:
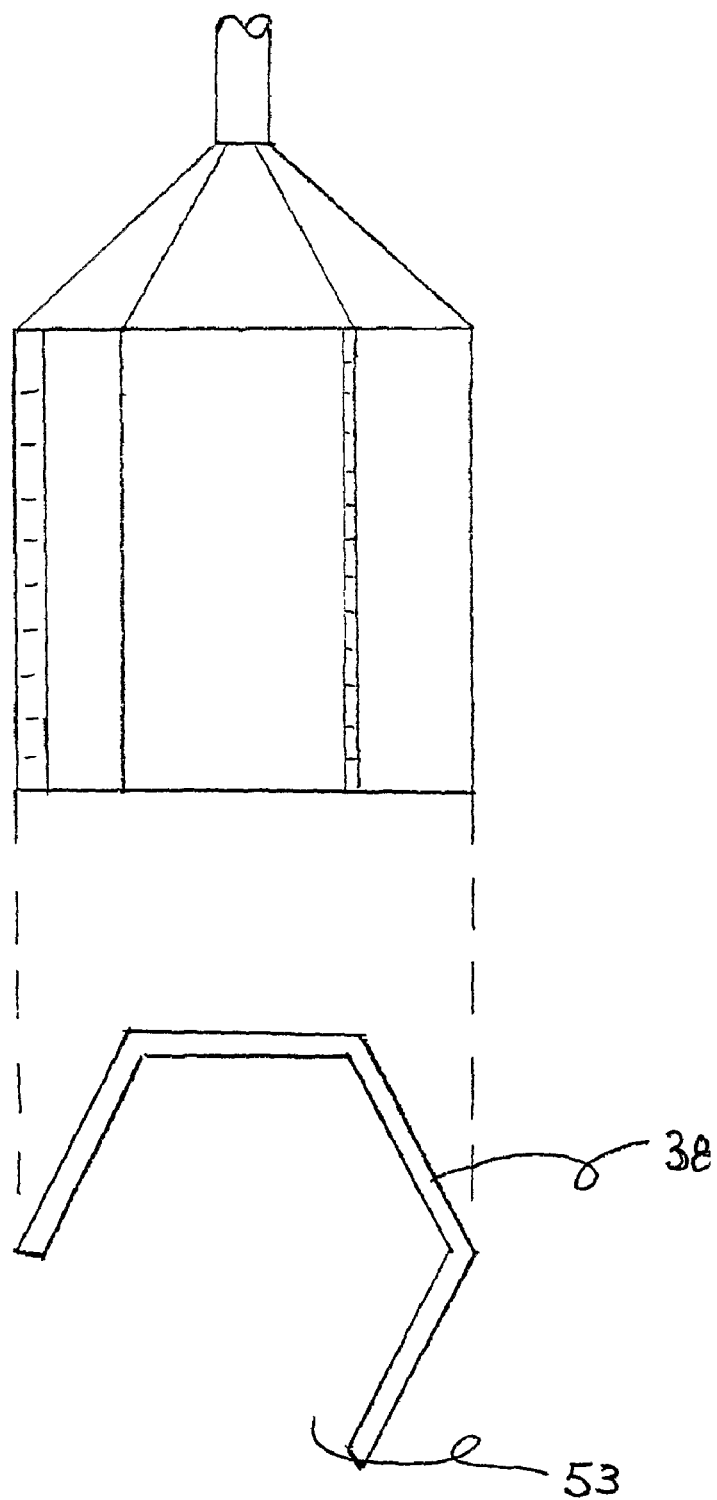
FIG. 20 shows an embodiment of a plant punch apparatus in side view with a projection view of its lower surface.
Figure 21:
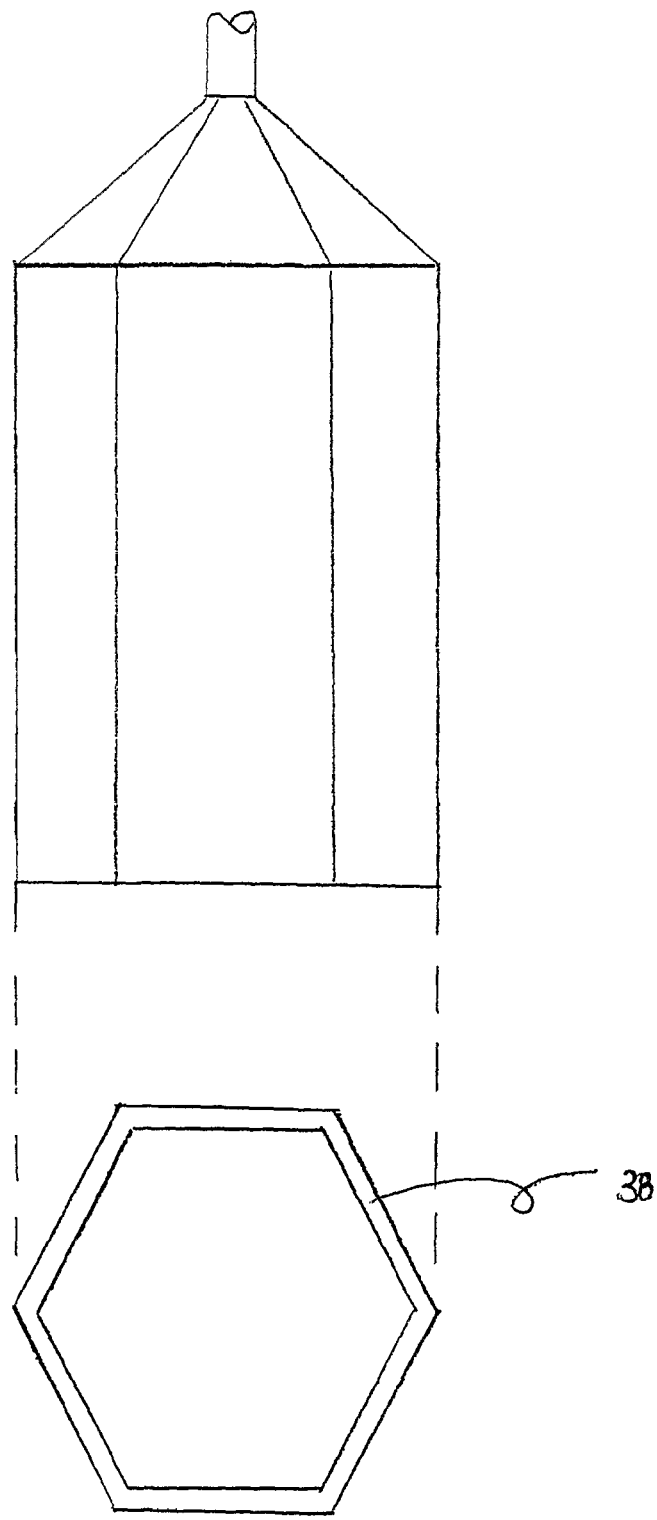
FIG. 21 shows an embodiment of a plant punch apparatus in side view with a projection view of its lower surface.
Figure 22A:
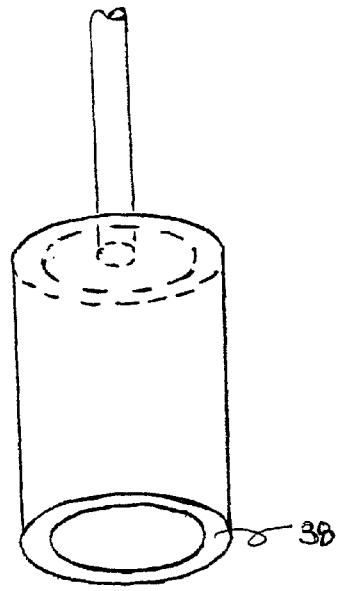
FIG. 22(a-d) each show an embodiment of a plant punch apparatus in perspective view.
Figure 22B:
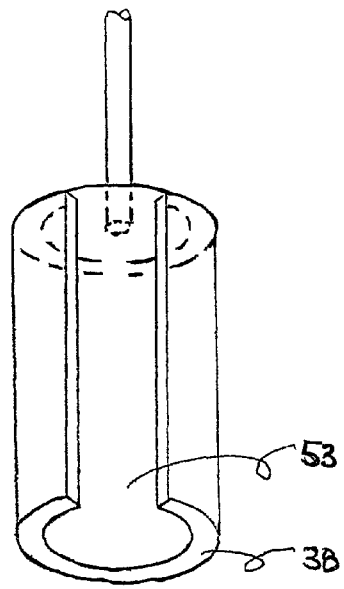
Figure 22C:
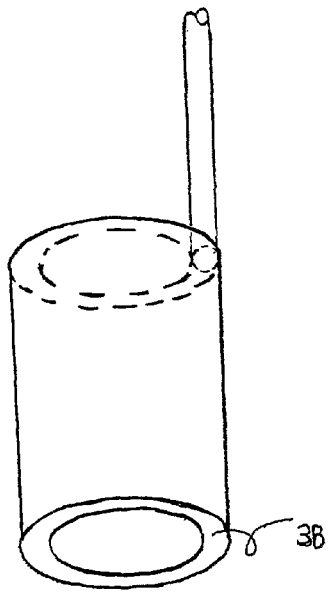
Figure 22D:
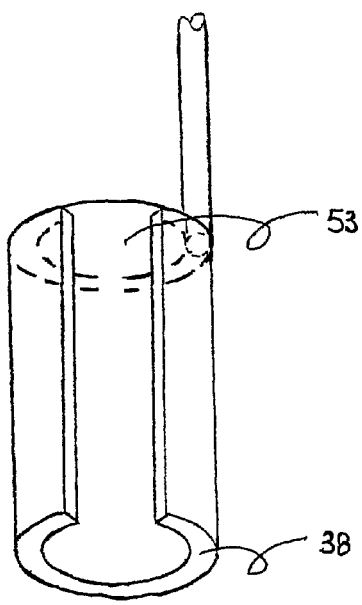
Figure 23:
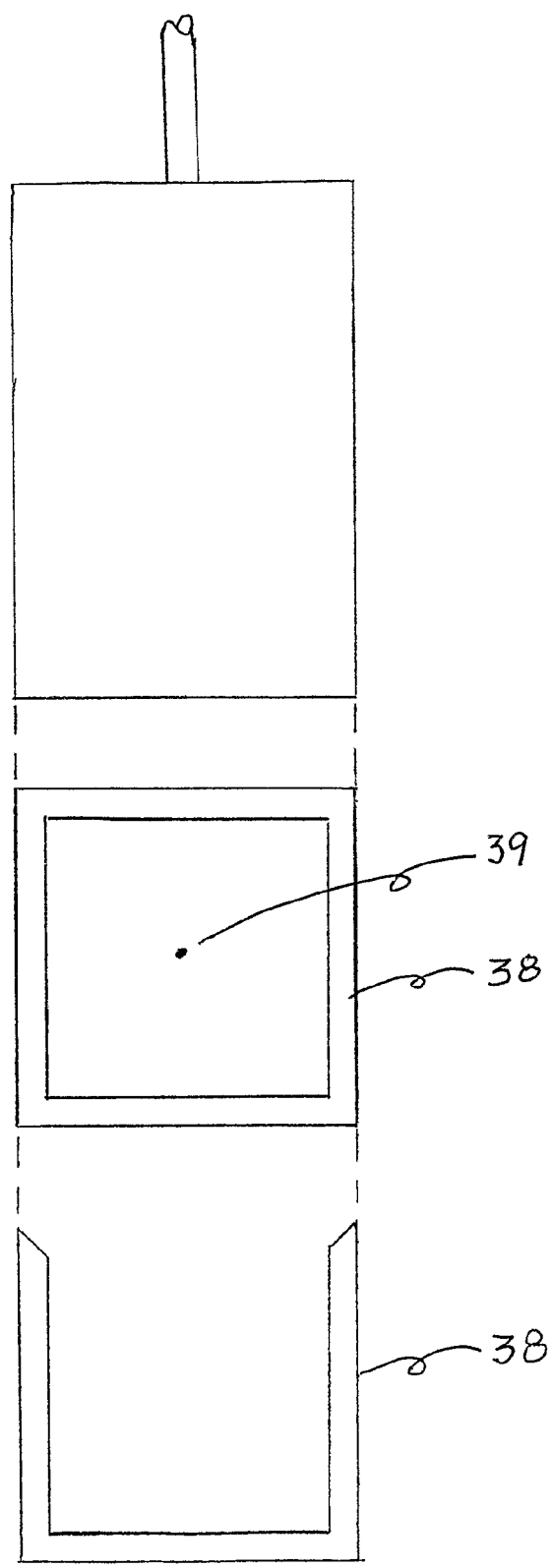
FIG. 23(a, b) each show an embodiment of a plant punch apparatus in side view with a projection view of its lower surface.

The downward plant punch force application surface, upon being positioned horizontally about (e.g., externally of and partially around) the plant growth medium emerging plant structure, may be established at least 180 degrees about it (see, FIG. 18, as but one example). In some embodiments, it is also established 360 degrees about it (e.g., see FIG. 21 where there is no perimeter gap in the downward plant punch force application surface or in the plant punch head or plant punch body), but in others the downward plant punch force application surface is established less than 360 degrees about it. In embodiments where the downward plant punch force application surface can be established 360 degrees around the plant growth medium emerging plant structure (see, e.g., FIGS. 17, 21, 22(*a,c*), 23(*a*)), the plant punch apparatus (having an "unbroken" downward plant punch force application surface) is not well suited for use in the shifting plant punch machine because there is not gap through which the plant may be passed during part of the horizontal shift of the plant punch head (it is however possible that the shift could occur above the top of the plant, however, and such "unbroken" designs could be used, but in such a case there is no benefit afforded by the use of the shifting plant punch machine). The "unbroken" plant punch apparatus or element is, however, well suited for use in a traditional, "non-shifting" plant punch machine that is capable of only purely vertical motion of the plant punch heads. Thus, with such novel plant punch apparatus (i.e., of unbroken designs), traditional plant punch machines can be used to abate injury and stress imposed by known plant punch heads when used in the traditional machines.

Any embodiments where the downward plant punch force application surface can be established less than 360 degrees horizontally about the plant growth medium emerging plant structure and that have a plant punch body are well suited for use in a shifting plant punch machine where sheltering of the plant during the punch is desired. In order to establish the downward plant punch force application surface less than 360 degrees about the plant growth medium emerging plant structure (in embodiments so limited), during "the shift," at least a portion of the plant may be passed through a gap of the downward plant punch force application surface (a gap which is clearly apparent around the plant growth medium emerging plant structure when the downward plant punch force application surface is positioned horizontally about the plant growth medium emerging plant structure). The downward plant punch force application surface may have lateral access around at least a portion of the plant (e.g., a plant growth medium emerging plant structure, or perhaps the entire plant if the gap is high enough, or perhaps an upper portion) via the gap in the downward plant punch force application surface and, if there is a plant punch body, a vertical gap or slot in that plant punch body. If it has lateral access around an upper portion, then it will be necessary to vertically move the downward plant punch force application surface after such access is gained so that the downward plant punch force application surface is established partially around (less than 360 degrees around) the plant growth medium emerging plant structure (which of course is near the bottom of the plant). In at least one embodiment, the plant punch apparatus may have a plant punch body and a plant punch head that each have a perimeter gap that opens to an inner spatial void. The perimeter gap of each of the plant punch body and the plant punch head may be adapted so that a portion (e.g. a first portion through the gap of the plant punch head and a second portion through the gap of the plant punch body) of a plant to be punched can be passed through the perimeter gap of each of the plant punch body and the plant punch head.

Horizontal cross section shapes of the downward plant punch force application surface that has a gap include (but are not limited to) partial circle, partial annular, partial polygonal, partial rectangular, partial hexagonal, and partial polygonal to name a few. Shapes without a gap include (but are not limited to) circular, annular, polygonal, rectangular, hexagonal, and partial polygonal, to name a few. The plant punch body may have a first portion that is contiguous with the plant punch head. This portion (e.g., at least a lower one-third, at least a lower one-half, or at least a lower two-thirds of the plant punch body) or all of the plant punch body along its height, may have a horizontal cross section shape and/or size that substantially mimics the horizontal cross section shape and/or size, respectively, of the downward plant punch force application surface (see, e.g., FIG. 18). All of the plant punch body (along its height) may have a gap, or only a portion (e.g., a lower portion) may. Where there is no gap in the downward plant punch force application surface, the downward plant punch force application surface may be the to be unbroken or continuous (see, FIG. 21). However, as discussed, it may have one or more gap, and the above-mentioned first portion of the plant punch body (or the entire height of the plant punch body (see, e.g., FIG. 22(*d*))) may establish a vertical, slot-like opening above the gap in the downward plant punch force application surface (the term slot is intended to encompass a wide variety of openings, and not merely a vertical, rectangular opening). The vertical slot-like opening may open to an inner spatial void within the plant punch body and thus, the two may be in fluidic communication (see, e.g., FIG. 22(*d*)). The inner spatial void may be sized to contain vegetative parts of the plant while it is being punched (see, FIG. 18, where dashed lines indicate those portions of the plant whose view is obstructed by the plant punch element). The void may taper with an increase in height of the plant punch body (see, e.g., FIG. 16(*a,b*)). It may have an upper end (or, in some embodiments it might be open—see, e.g., FIGS. 22(*c,d*)) that is substantially at the same height as the upper end of the vertical, slot-like opening (in those embodiments where the vertical slot-like opening does in fact have an upper end).

The plant punch body may have of any number of shapes (see FIGS. 16-23 for a few possible shapes). It may be roughly conical from a side view, frusto-conical, cylindrical, bell shaped, block, as but a few shapes. It should be understood that one of the main objectives of certain embodiments of the apparatus having the plant punch body is to establish a protective shroud around part or all of the plant during the plant punch and that there are a variety of shapes that can achieve this, each of which is within the scope of the subject matter of at least some of the claims. Indeed, at least one embodiment of the invention involves the step of establishing the protective shroud around less than 360 degrees of at least a one-third of height portion of plant during said plant punch. This step may comprise moving the protective shroud so that at least part of the plant is passed through a gap in the protective shroud, and so that the protective shroud obtains a position around the at least a one-third of height portion of said plant.

It should be understood that the term around (e.g., where a first part is established around a second part) does not require that the first part surround the second part, nor that either part be round or circular. It merely requires that the first part be established at least partially outside of or externally of (as opposed to inside or internally of) the second part. Also, the term contain (e.g., where a first part contains a second part) does not require that the first part surround the first part on all sides (or even on any side), but merely that the first part at least partially encloses the second part or "has within" it the second part. Thus, a tube open at both ends and having a longitudinal slot of 180 degrees can be the to contain something inside it.

The fact that many of the inventive features (e.g., the shifting feature, and the sheltering plant punch body) may be difficult to notice without close inspection deserves note. For example, a shifting plant punch machine might look identical to a conventional, non-shifting machine, to a casual observer (perhaps even when the machine is in operation), because the horizontal plant punch head movement mechanism may be inconspicuous and difficult to discern among the many parts of the often intricate machine. Further, the actual shift might be so small as to be difficult to detect. Many "sheltering" plant punch bodied designs may be hard to discern as novel without picking the plant punch element up and noting the at times hidden inner spatial void. Despite their often inconspicuous appearance, however, these features are indeed very significant, at least in how they may effect a higher transplant yield and cut production and operation costs.

At least one embodiment of the inventive technology is a plant punch apparatus that may comprise: a plant punch element comprising a plant punch head, where the plant punch head itself comprises: a downward plant punch force application surface that is adapted so that: during a plant punch event, and while the plant punch head is displaced downwardly against plant growth medium in which a plant to be punched during the plant punch event is established, and while the downward plant punch force application surface is positioned horizontally about a plant growth medium emerging plant structure, the downward plant punch force application surface displaces the plant without contacting the plant growth medium emerging plant structure. Further, the downward plant punch force application surface has a horizontal cross section shape and size. The plant punch apparatus may further comprise: a plant punch element movement mechanism that is operable to move the plant punch element through a plurality of spatial points that defines a plant punch element travel path, where the plurality of spatial points comprises a first spatial point having a first horizontal distance from a vertical spatial axis defined by a plant emergent point, where the plant emergent point is defined by a site at which the plant growth medium emerging plant structure emerges from plant growth medium before it is punched from its container during the plant punch event, and where the plant emergent point defines a plant emergent point horizontal plane. The plurality of spatial points may further comprise a second spatial point that: defines a second horizontal plane that is below the first spatial point and above the plant emergent point horizontal plane, and has a second horizontal distance from the vertical spatial axis. In preferred embodiments, the first horizontal distance is greater than the second horizontal distance, and the plant punch element travel path intersects and passes through and below the plant emergent point horizontal plane. Further, the plant punch element travel path has a vertical component at its intersection with the plant emergent point horizontal plane, and the plant punch element travel path has a horizontal component at some point from the first spatial point to the second spatial point. Additionally, the plant punch head, upon being positioned horizontally about the plant growth medium emerging plant structure, may be established less than 360 degrees about the plant growth medium emerging plant structure so as to form at least one plant punch head gap around part of the plant growth medium emerging plant structure. The at least one plant punch head gap may comprise one plant punch head gap that allows the punch head to be moved laterally to a position around at least a portion of the plant at some point during the travel of the plant punch element along the plant punch element travel path. The apparatus may further comprise a frame that supports the plant punch element movement mechanism. Of course, the plant punch element may further comprise a plant punch body, and that plant punch body may itself comprise a vertical, slot-like gap extending along at least part of the height of the plant punch body, and above the one plant punch head gap.

In another aspect of the invention, a plant punch method comprises the steps of: moving a first plant punch element that comprises a first plant punch head downwards from a first position; and moving the first plant punch element in towards a vertical spatial axis defined by a plant emergent point, wherein the plant emergent point is defined by the site at which a plant growth medium emerging plant structure of a first plant to be punched emerges from plant growth medium in which the first plant is established before it is punched from a first container during a plant punch event. The method may further comprise the steps of moving the first plant punch element so that at least part of the first plant is passed through a perimeter gap of the first plant punch head; establishing the first plant punch head around at least part of the plant growth medium emerging plant structure; punching the first plant out of the first container with the first plant punch element to cause a first plant punch; and returning the first plant punch element to the first position.

Figure 3:
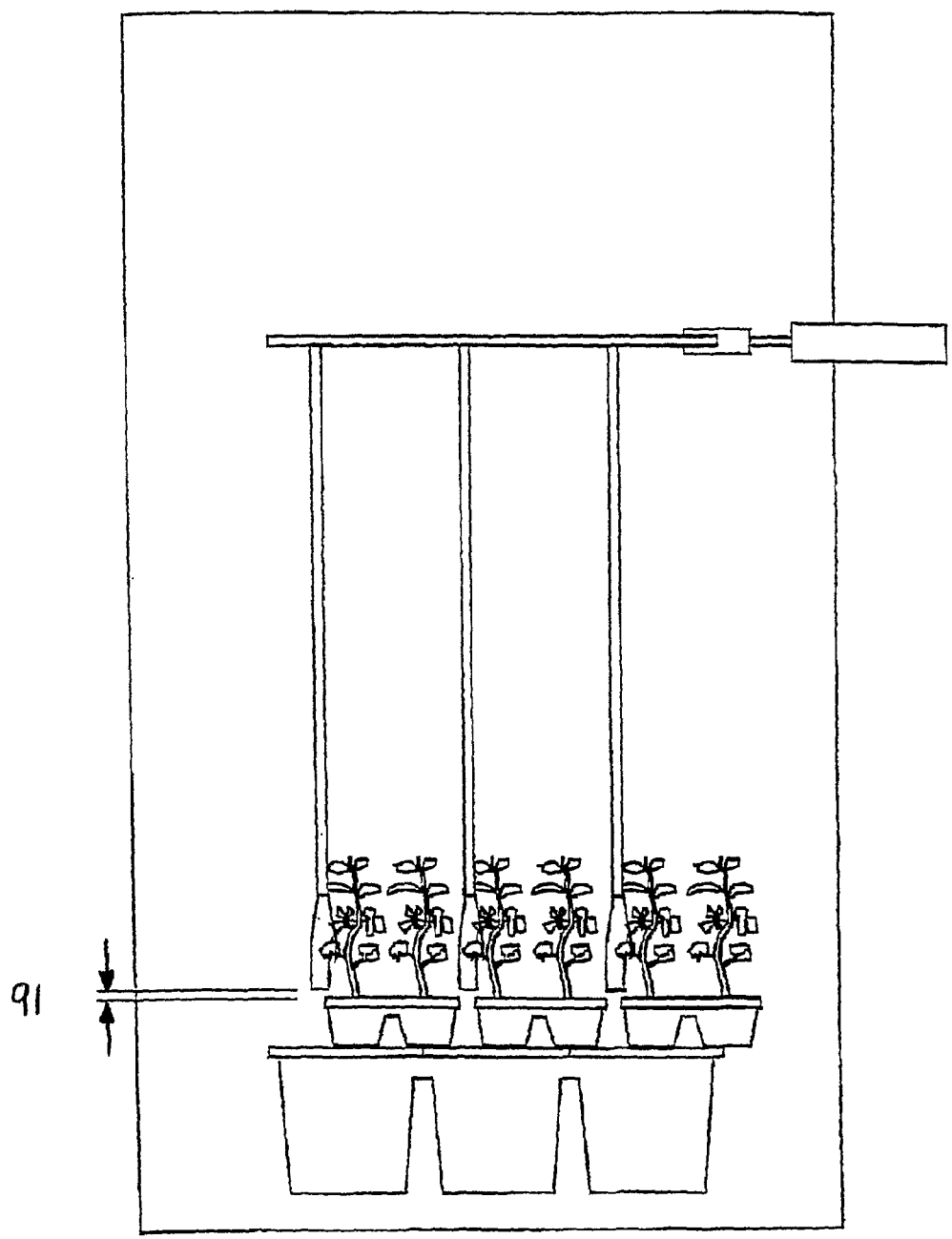
FIG. 3 shows a diagram of part during a subsequent stage of the plant punch cycle of the inventive shifting plant punch apparatus. Particularly, it can be noticed that the punch plate has been lowered to a position between the plants to avoid damage. The height above tray is adjustable depending on plant height and variety.
Figure 4:
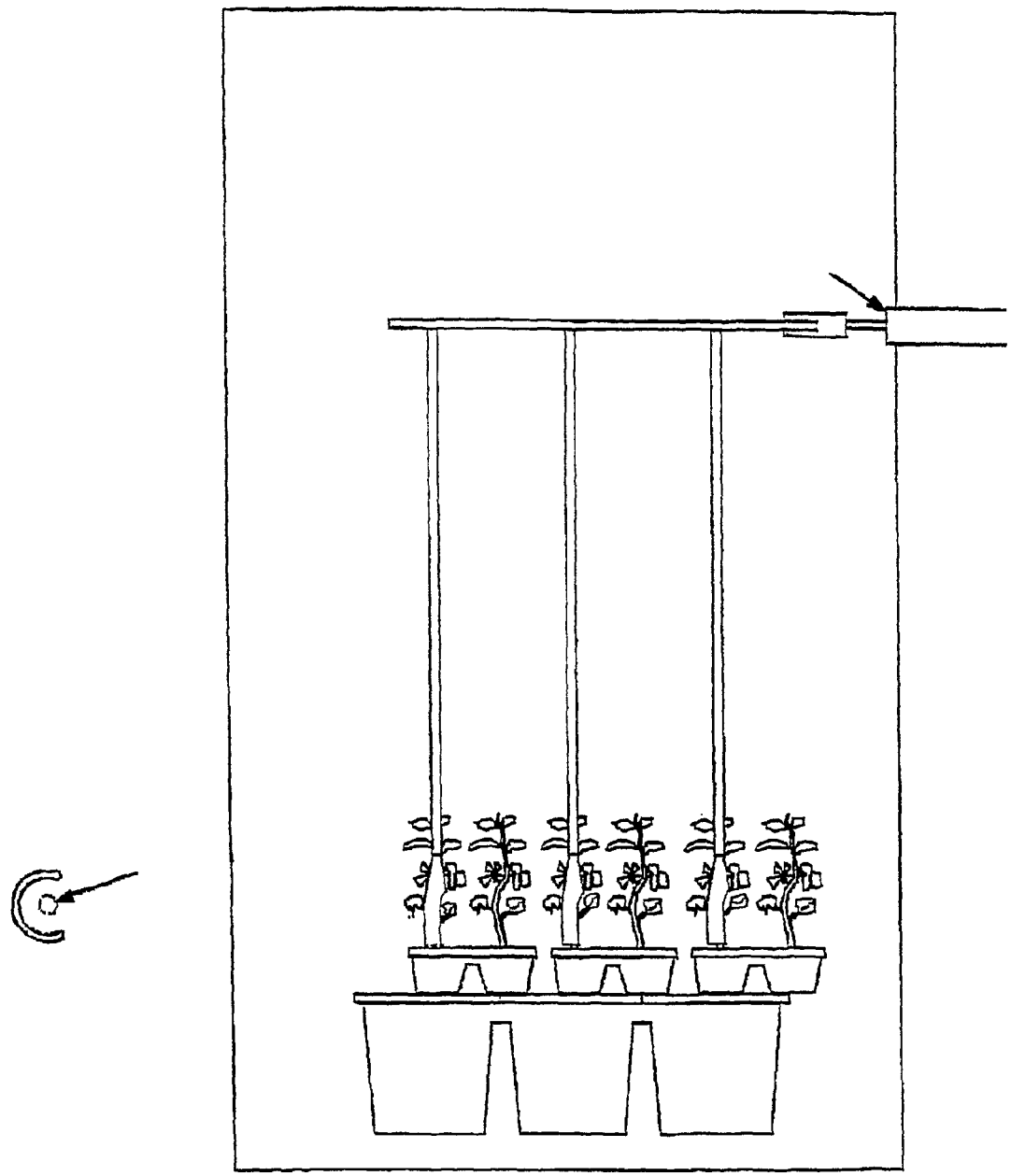
FIG. 4 shows a diagram of part during a subsequent stage of the plant punch cycle of the inventive shifting plant punch apparatus. Particularly, it can be noticed that an air cylinder may be included and upon actuation (perhaps by a switch of some sort), can shift the punch elements near or to the center of the plug. In this case, the plant punch head (e.g., the end of the plunger) is "C-shaped" to fit around the stem and perhaps also the foliage of the plant to minimize damage. Speed and angle of shifting motion is adjustable depending on plant depending on plant variety and size.
Figure 5:
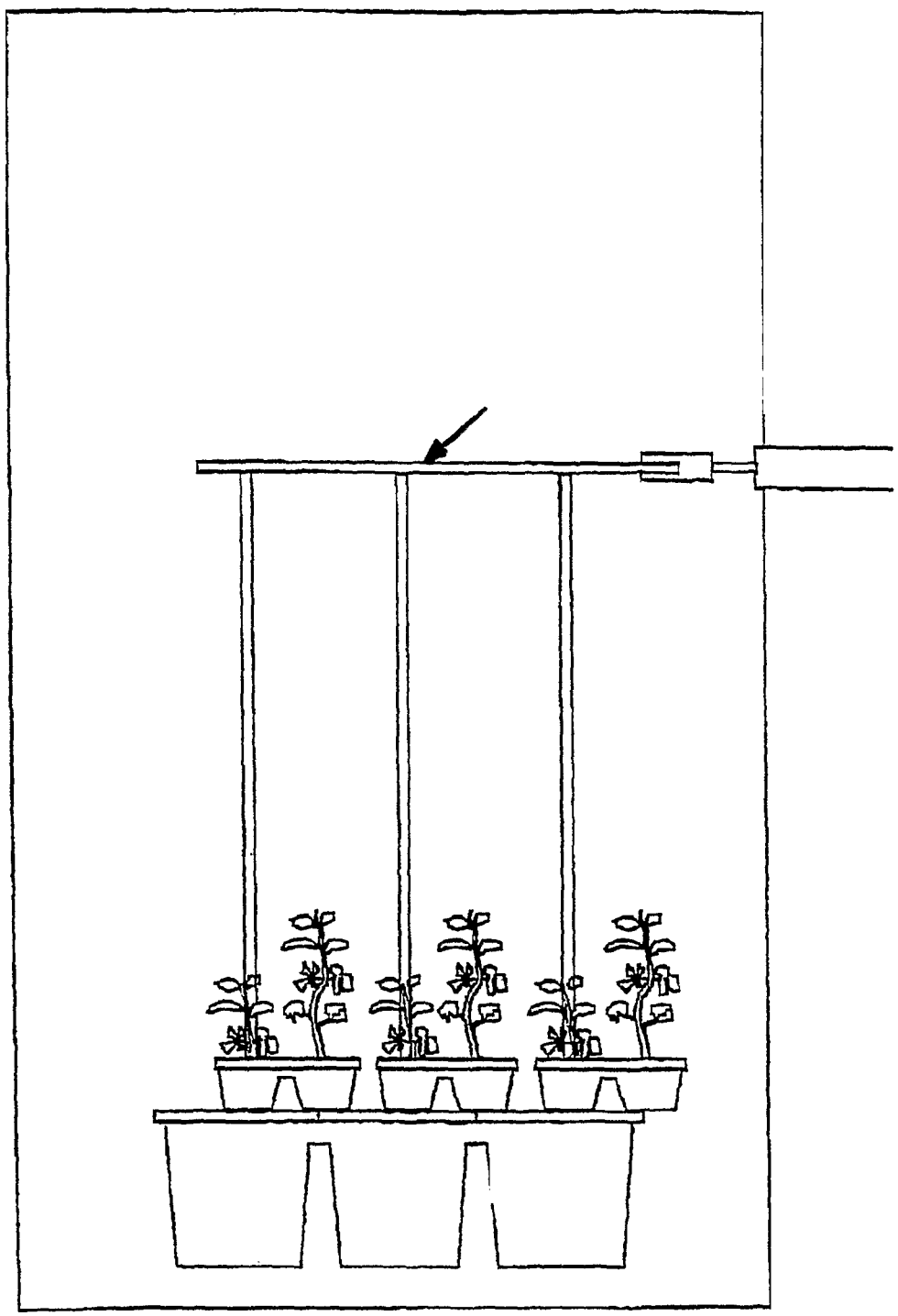
FIG. 5 shows a diagram of part during a subsequent stage of the plant punch cycle of the inventive shifting plant punch apparatus. Particularly, it can be noticed that the punch plate has been lowered, therefore pushing the plants (and perhaps some soil, forming a plug with the plant) through the bottom of the plug tray into the flat or pots. Planting depth may be adjustable.
Figure 6:
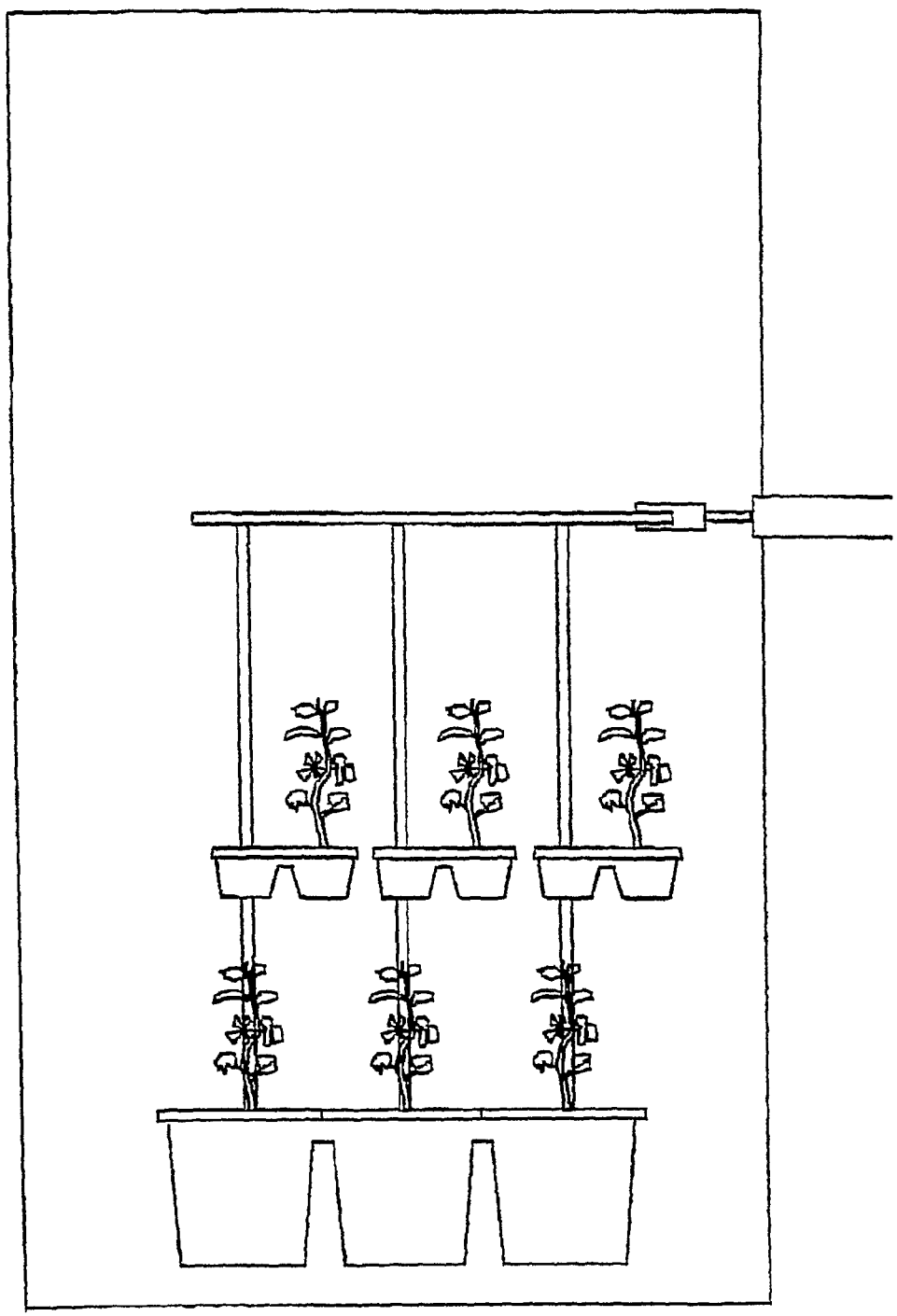
FIG. 6 shows a diagram of part during a subsequent stage of the plant punch cycle of the inventive shifting plant punch apparatus. Particularly, it can be noticed that the punch elements can hold the plugs in position as the plug tray is raised.
Figure 7:
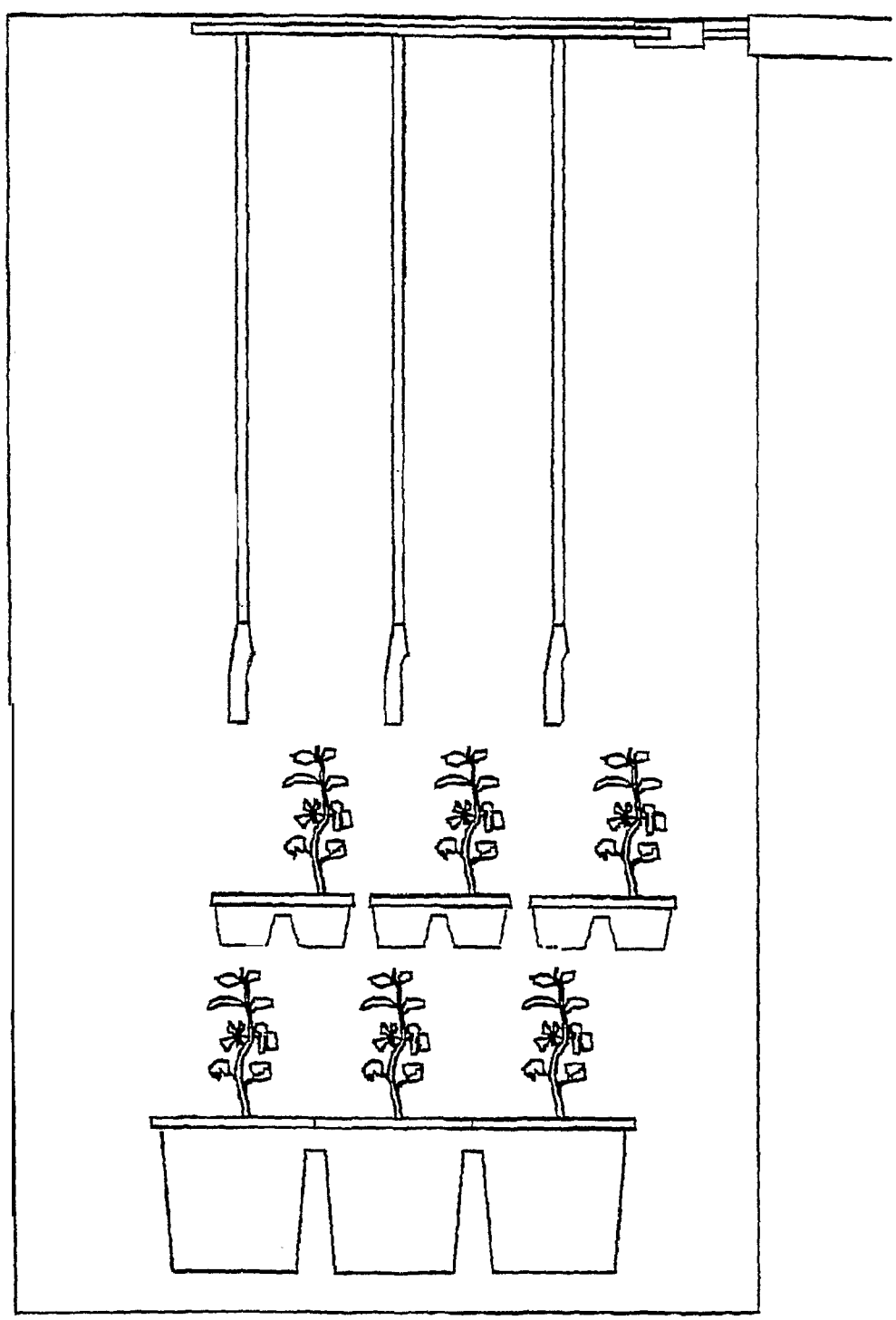
FIG. 7 shows a diagram of part during a subsequent stage of the plant punch cycle of the inventive shifting plant punch apparatus. Particularly, it can be noticed that the punch plate has been raised to the starting height (e.g., the height of the home position). The plate can at this time (or another time) be shifted to its original or home position (see FIG. 1).
Figure 8:
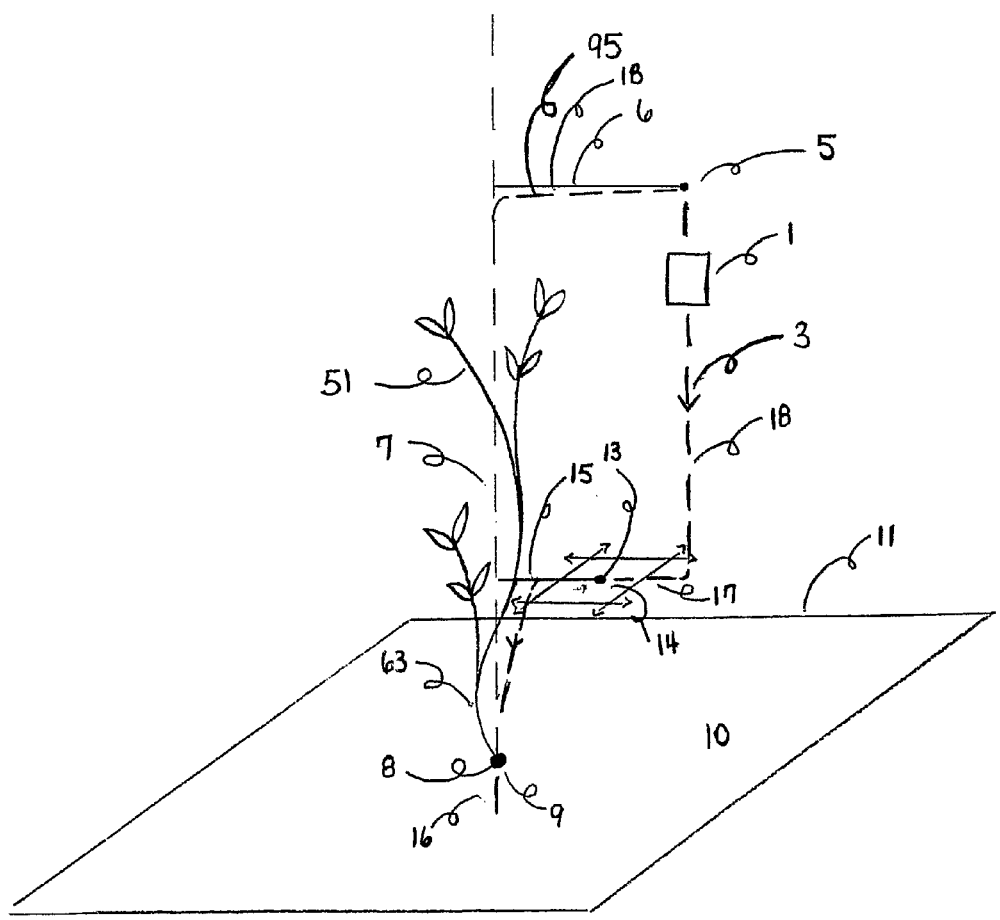
FIG. 8 shows a plant punch element travel path in relation to the plant to be punched, with a plant punch element in an intermediate position (i.e., neither at the top or bottom of a plant punch cycle), of at least one embodiment of the invention.
Figure 9:
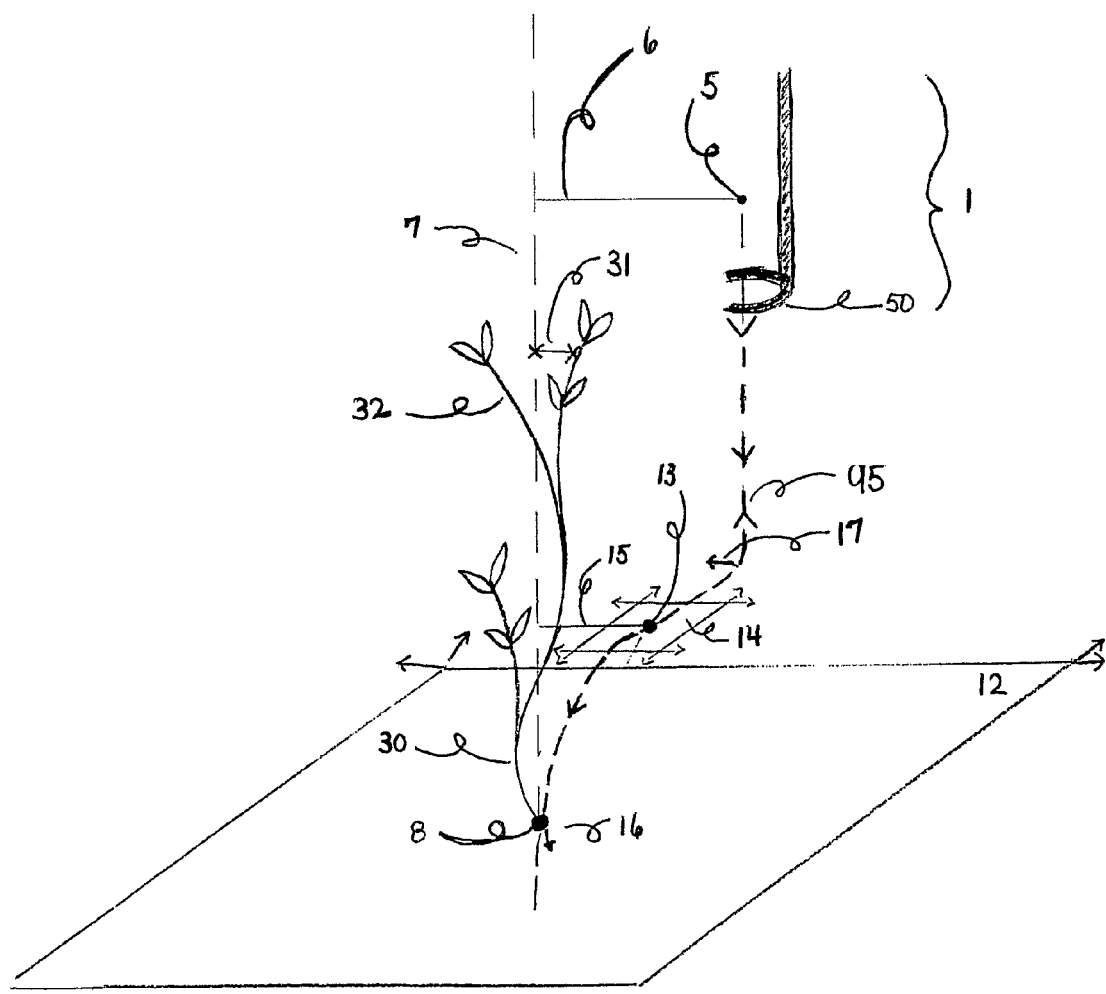
FIG. 9 shows a plant punch element travel path in relation to the plant to be punched, with a plant punch element in an intermediate position, of at least one embodiment of the invention.
Figure 10:
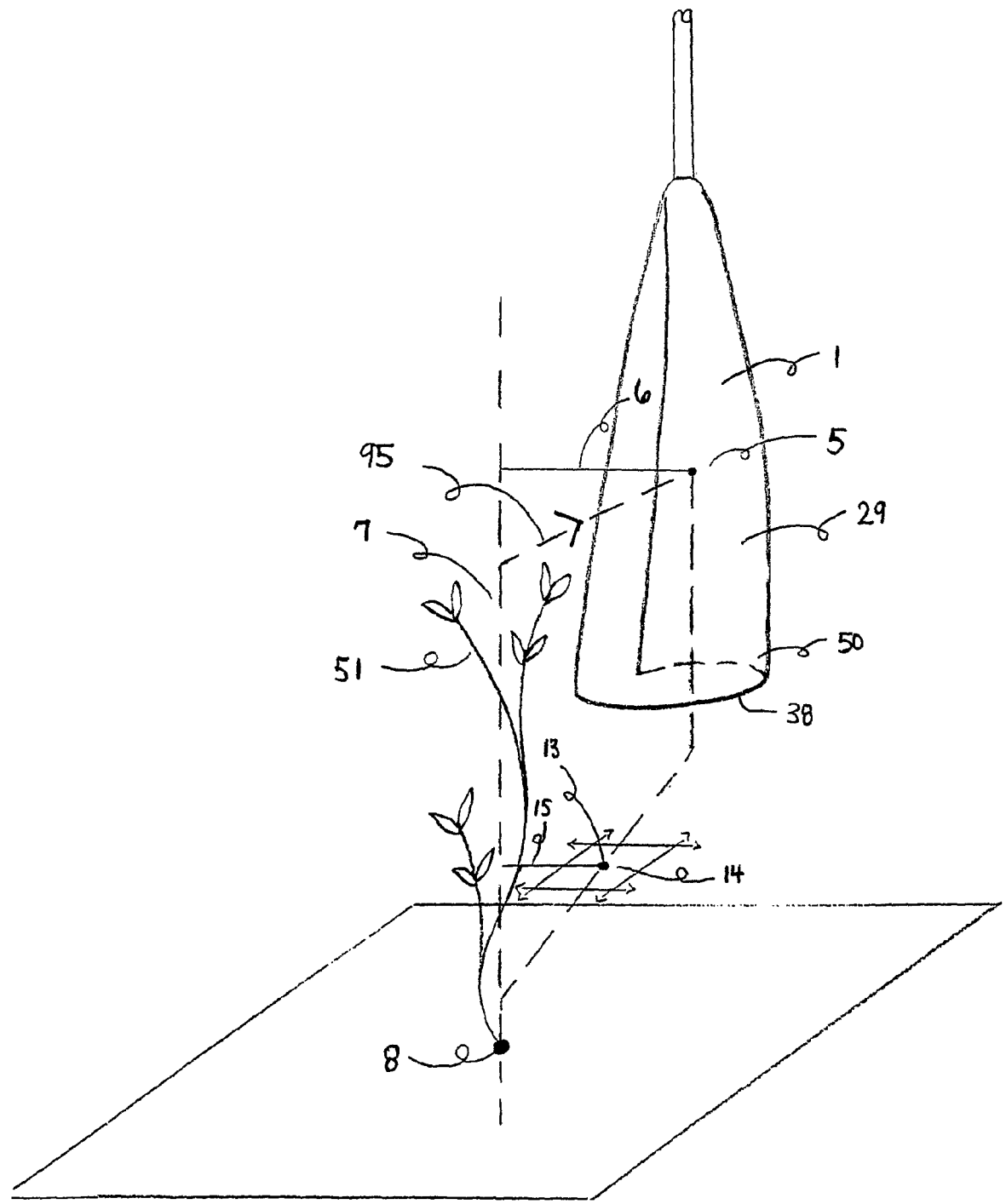
FIG. 10 shows a plant punch element travel path in relation to the plant to be punched, with a plant punch element in an intermediate position, of at least one embodiment of the invention.
Figure 11:
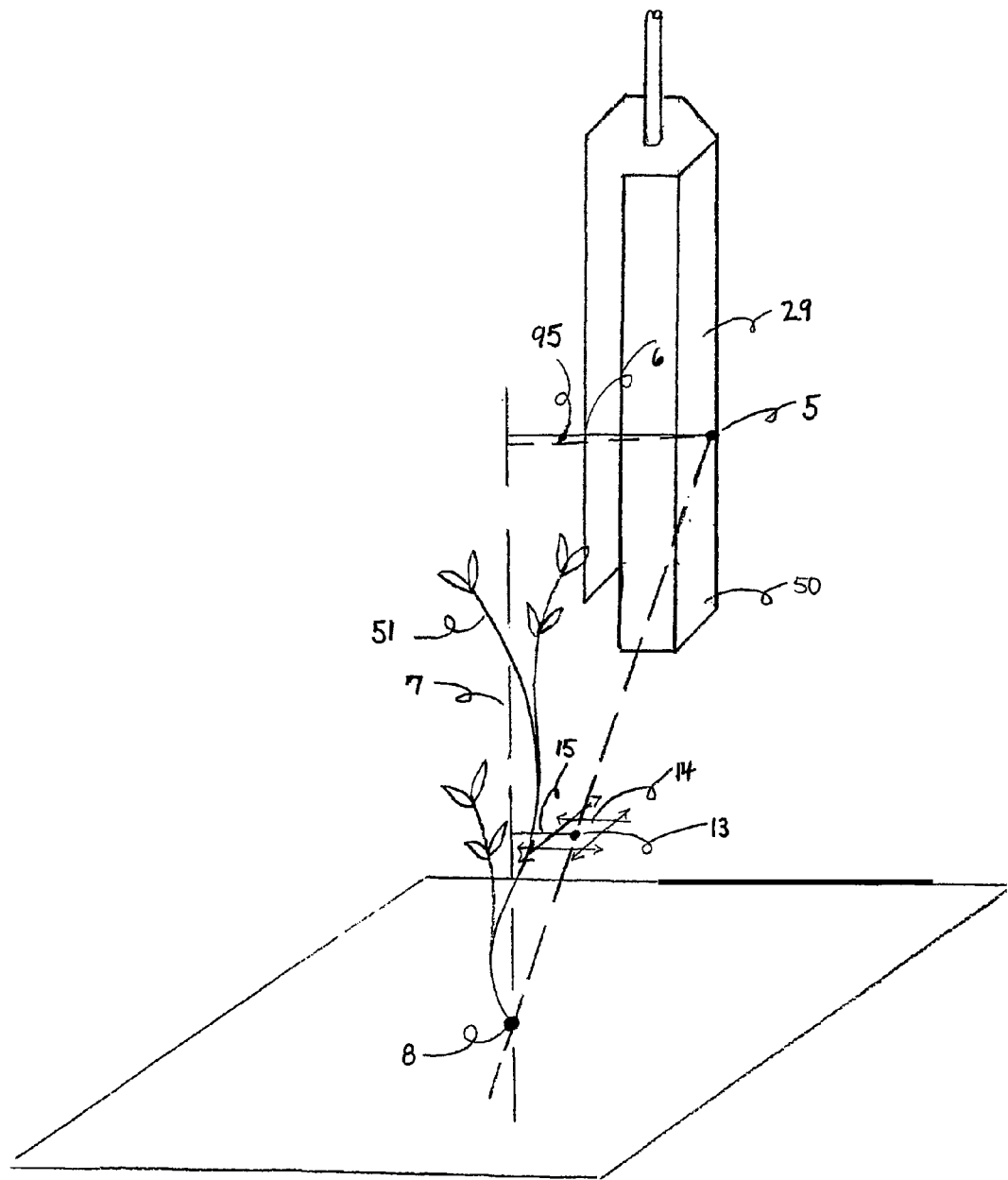
FIG. 11 shows a plant punch element travel path in relation to the plant to be punched, with a plant punch element in an intermediate position, of at least one embodiment of the invention.
Figure 32:
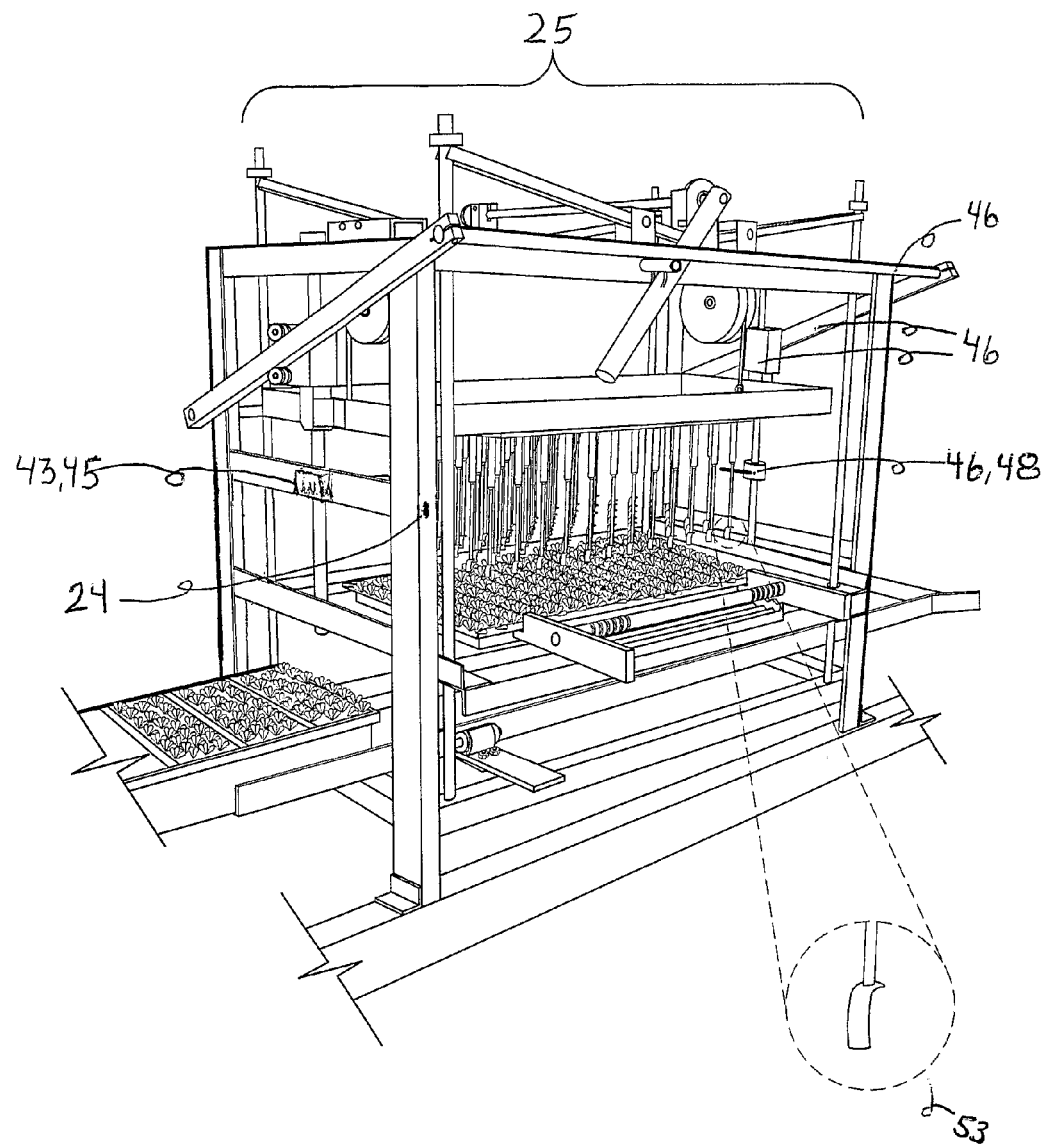
FIG. 32 shows a plant punch apparatus (here, a comprehensive plant punch machine) having a generic plant punch element movement mechanism and shrouding plant punch bodies.

Examples of the apparatus described immediately above (and examples relative to the methods described immediately above) are shown in FIGS. 1-7 and 31. FIGS. 1-7 show different stages of the plant punch cycle in which a "sheltering" plant punch body is used to protect the plant while it is punched. A comparison of FIGS. 3 and 4 shows how the plant punch element may be moved in towards a vertical spatial axis that contains a plant emergent point. Indeed, the plant punch element travel path is more clearly described in FIGS. 8-13. FIG. 31 shows a substantially comprehensive plant punch apparatus (here a plant punch machine) having a pneumatic horizontal plant punch element movement mechanism and a manual vertical plant punch element movement mechanism. Of course, there are several other ways of achieving any type of motion, which would be obvious to one skilled in the art once that individual were presented the inventive concept of "shifting" (e.g., electromagnetic, robotic, manual, hydraulic, pneumatic, as but a few examples). These are represented generically in FIG. 32. Similarly, manners of effecting adjustability of any motion would be obvious to one skilled in the art.

The method may also involve vertically moving an upper tray (70) relative to a lower tray (71) during the plant punch. Such relative motion may involve a lowering of the upper tray before the plant punch head penetrates plant growth medium in which the plant to be punched is established (see FIGS. 1 and 2), and, as a separate step, raising the upper tray relative to the lower tray after the plant punch head penetrates plant growth medium in which the plant to be punched is established (see FIGS. 5 and 6). Such relative, vertical motion may facilitate plant removal, results in a cleaner transplant, and improves transplant yield. It is not, however, a required step, as acceptable results may at times be obtained by merely initially placing the upper tray (e.g., a propagule tray or flat) at an appropriate position above the lower tray (e.g., immediately above the lower tray). It should be noted that the lower tray may instead be a pot or pots, or any type of container larger than the individual cells of the upper tray.

Figure 24:
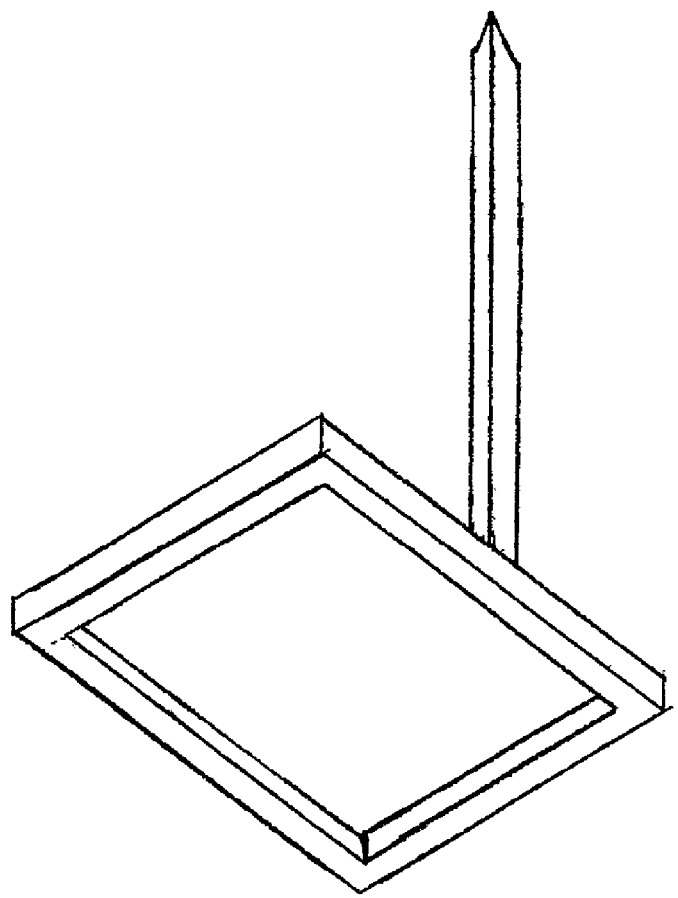
FIG. 24 shows a perspective view of an embodiment of a plant punch apparatus.
Figure 25:
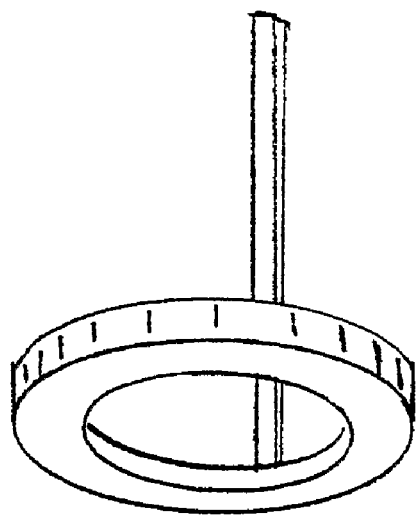
FIG. 25 shows a perspective view of an embodiment of a plant punch apparatus.
Figure 26:
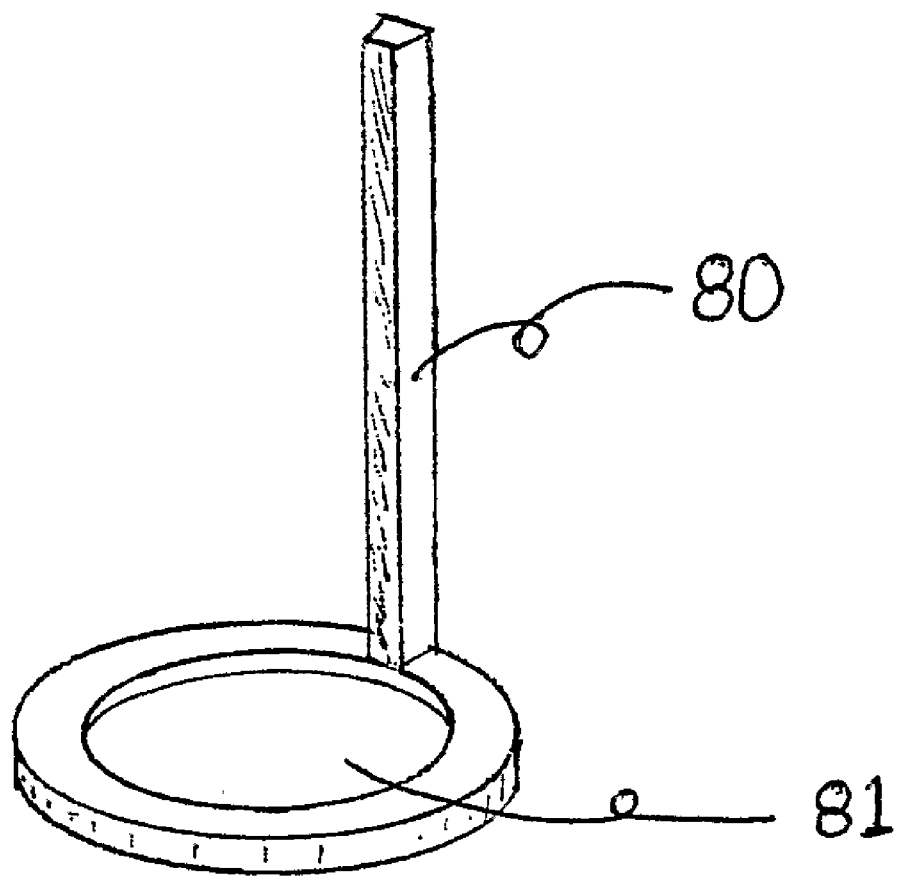
FIG. 26 shows a perspective view of an embodiment of a plant punch apparatus.
Figure 27:
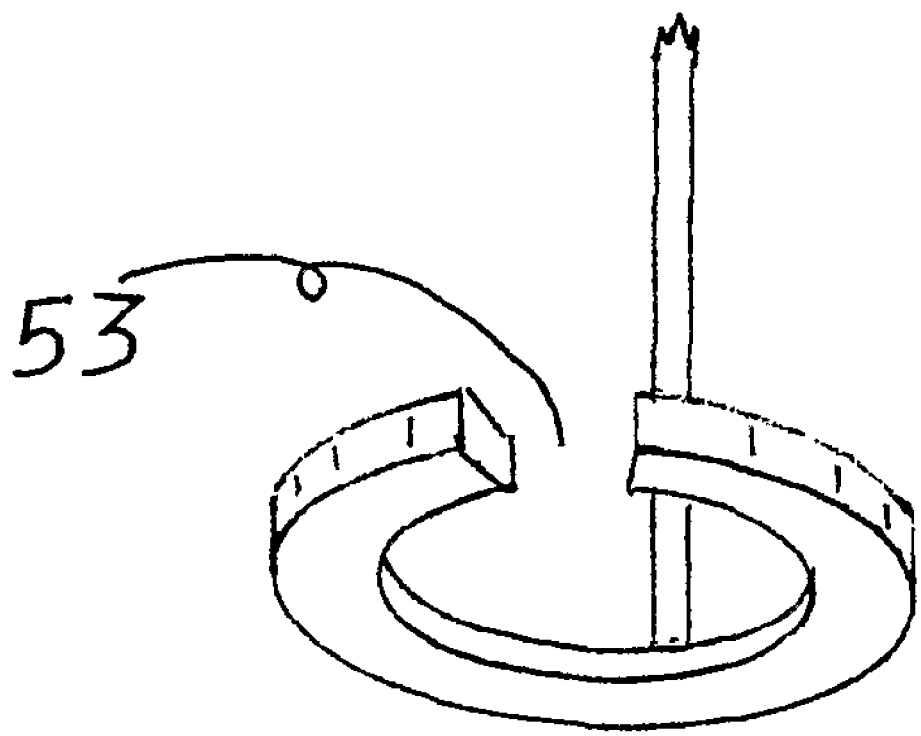
FIG. 27 shows a perspective view of an embodiment of a plant punch apparatus.
Figure 28:
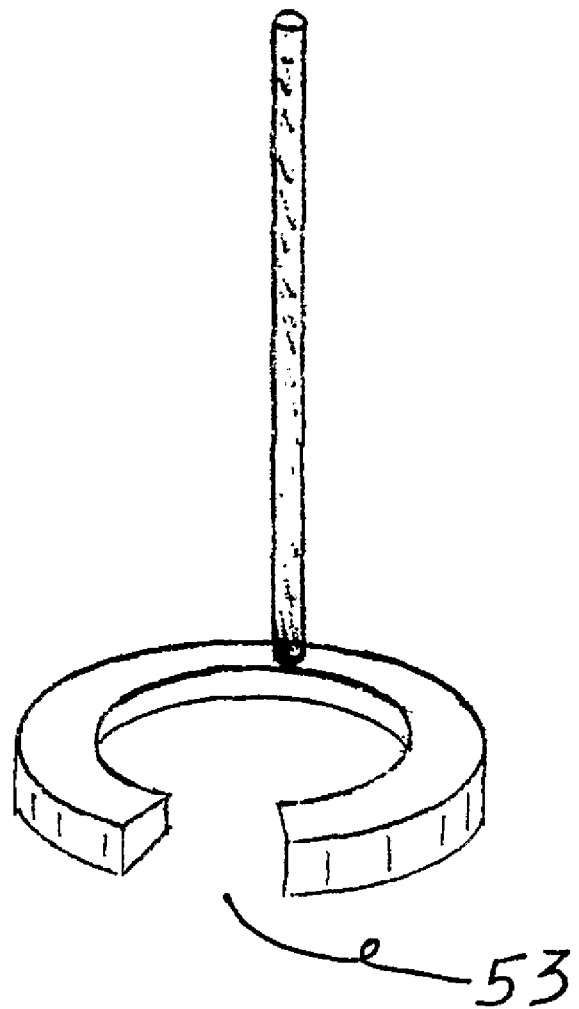
FIG. 28 shows a perspective view of an embodiment of a plant punch apparatus.
Figure 29:
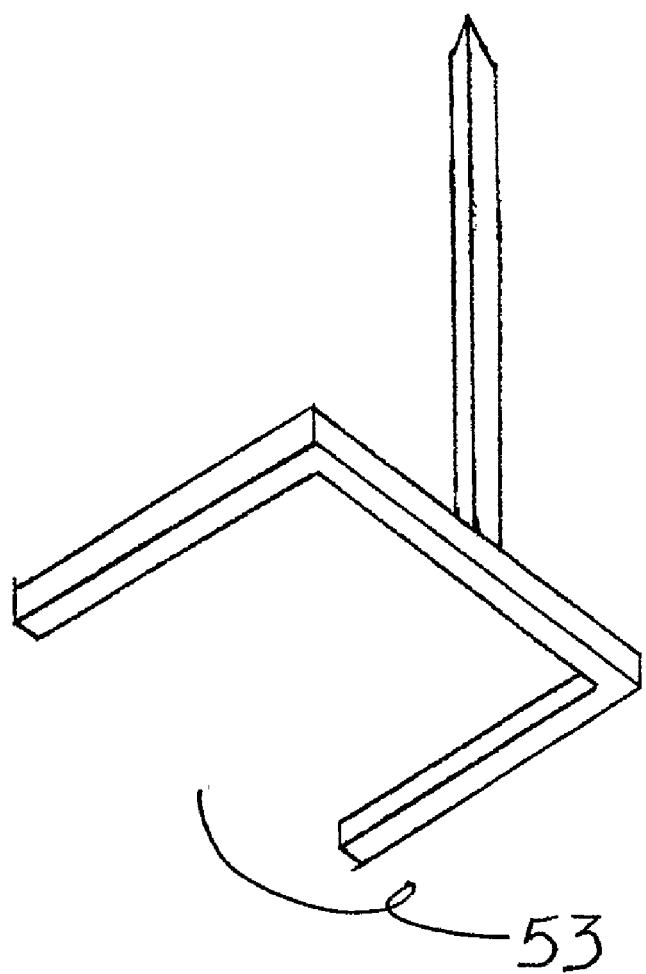
FIG. 29 shows a perspective view of an embodiment of a plant punch apparatus.
Figure 30A:
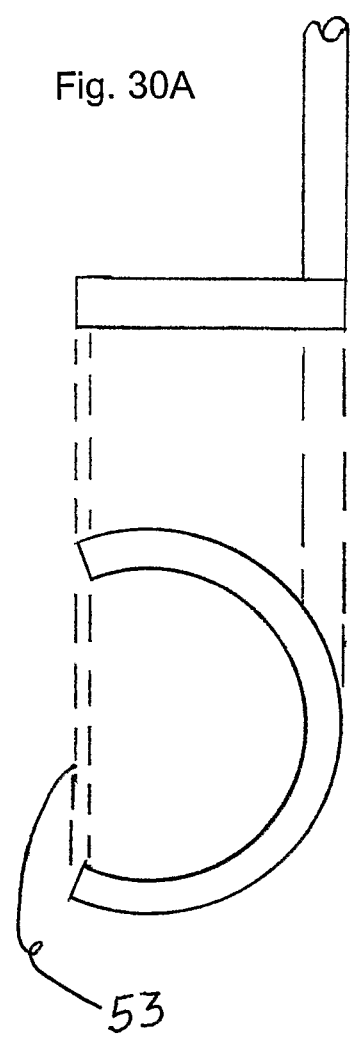
FIG. 30(a,b) each show an embodiment of a plant punch apparatus in side view with a projection view of its lower surface.
Figure 30B:
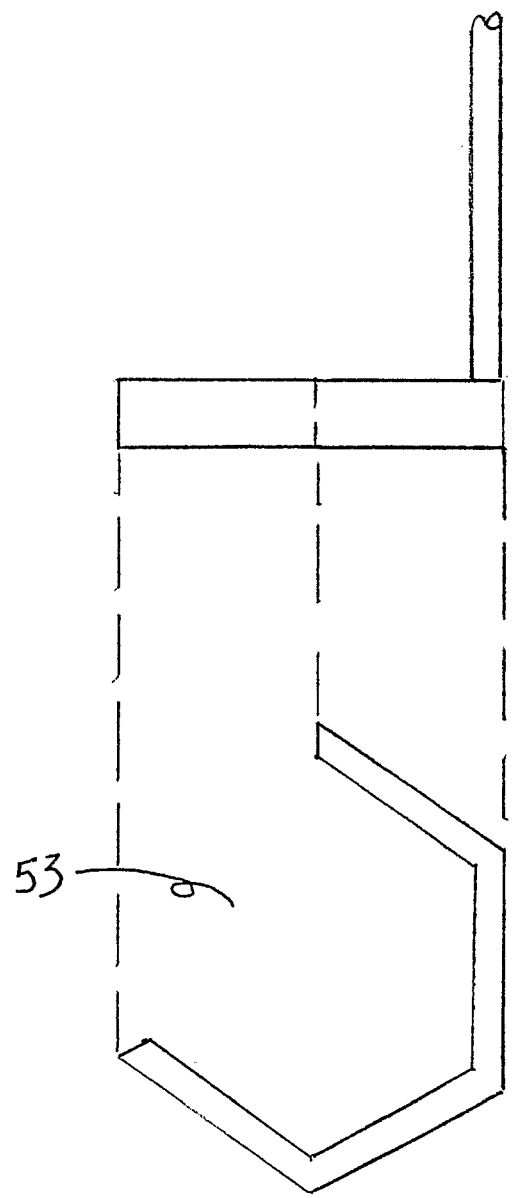

Another plant punch apparatus, some specific embodiments of which are depicted in FIGS. 24, 25 and 26, may comprise: a plant punch head that itself comprises: a downward plant punch force application surface that is adapted so that: during a plant punch event, and while the plant punch head is displaced downwardly against plant growth medium in which a plant to be punched during the plant punch event is established, and while the downward plant punch force application surface is positioned horizontally about a plant growth medium emerging plant structure, the downward plant punch force application surface displaces the plant without contacting the plant growth medium emerging plant structure. The plant punch head has a horizontal cross section shape and size, and the plant growth medium emerging plant structure is that vegetative structure of the plant that emerges from the plant growth medium and supports upper vegetative portions of the plant. The plant punch head may be unbroken and without a perimeter gap, and the plant punch head may horizontally surround a spatial void that is internal of the plant punch head when the plant punch apparatus is installed in a plant punch machine. The horizontal cross section shape and size is adequate to surround a plant growth medium emerging plant support structure at an initiation of a plant punch event (e.g., penetration of plant growth media). The apparatus might not comprise a plant punch body, and the horizontal cross section shape and size may be adequate to surround a majority of an upper vegetative portion of the plant. Further, the apparatus may comprise a downward force transmission element (80) connected with the plant punch head, and there may be no physical material internal (81) of the plant punch head. Such absence of material would allow the plant punch head to purely vertically descend around the entire height of the plant to a position where it can punch the plant without contacting plant growth medium emerging plant support structure.

It should be noted that inventive apparatus that are disclosed and claimed herein can be made using any of common, well known manufacturing techniques. For example, the plant punch head and body can be made using well know molding, lathing or extrusion techniques (as but three of many examples). Although the concepts are inventive, the manner of making and using the apparatus would be obvious to anyone with ordinary skill in the art. Similarly, it would be obvious to one skilled in the art from the description of the inventive methods disclosed herein how to use these methods. Further, it should be understood that, where appropriate and not inconsistent, the preceding discussion as to individual figure parts and specific claim limits applies not only, e.g., to the inventive technology described most immediately preceding the discussion, but also to other inventive technology described in the application, where that other inventive technology is indeed similarly limited. For example, the single instance of the definition of the plant emergent point applies not only to the inventive technology described immediately above the location in the application where that definition appears, but also to other technology described elsewhere in the application that uses the term "plant emergent point."

As can be easily understood from the foregoing, the basic concepts of the present invention may be embodied in a variety of ways. It involves both plant punching techniques as well as devices to accomplish the appropriate plant punch. In this application, the plant punch techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Not only are apparatus claims included for the device described, but also method or process claims are included to address the functions the invention and each element performs. Neither the description nor the terminology is intended to limit the scope of the claims in this or any subsequent patent application.

It should also be understood that a variety of changes may be made without departing from the essence of the invention. Such changes are also implicitly included in the description. They still fall within the scope of this invention. A broad disclosure encompassing both the explicit embodiments shown, the great variety of implicit alternative embodiments, and the broad methods or processes and the like are encompassed by this disclosure and may be relied in order to support one or more of the claims of this or any subsequent patent application. With this understanding, the reader should be aware that this disclosure is to be understood to support as broad a base of claims as deemed within the applicant's right that are designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "shelter" should be understood to encompass disclosure of the act of "sheltering"—whether explicitly discussed or not—and, conversely, were there effectively disclosure of the act of "sheltering", such a disclosure should be understood to encompass disclosure of a "shelter" and even a "means for sheltering" Such changes and alternative terms are to be understood to be explicitly included in the description.

Any acts of law, statutes, regulations, or rules mentioned in this application for patent; or patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the Information Disclosure Statement or other information statement or list of references filed with the application are hereby appended and hereby incorporated by reference, however, as to each of the above, to the extent that such information or statements incorporated by reference might be considered inconsistent with the patenting of this inventions such statements are expressly not to be considered as made by the applicants.

Thus, the applicants should be understood to have support to claim and make a statement of invention to at least: i) each of the plant punch devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, and xii) each potentially dependent claim or concept as a dependency on each and every one of the independent claims or concepts presented; xiii) each feature, component, and step shown as separate and independent inventions; and xiv) the various combinations and permutations of each of the above and of any elements of each claim. In this regard it should be understood that for practical reasons and so as to avoid adding potentially hundreds of additional claims, the applicant has presented the claims with initial dependencies only. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim as dependencies or elements under any other independent claim.

With regard to claims whether now or later presented for examination, it should be understood that for practical reasons and so as to avoid great expansion of the examination burden, the applicant may at any time present only initial claims or perhaps only initial claims with only initial dependencies. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Both all priority filing(s) and the claims set forth later in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The claims initially presented are to be understood as also stating in this textual section of the specification, clauses and subject matter that are expressly designated by the applicant to be part of the description of embodiments of the invention. They may be used by the applicant to support any later claim(s) recited, amended, or reinserted in this patent application and may be used to support any claims recited in any subsequent continuation, continuation-in-part, or division patent application. Further, even if subsequently amended, cancelled, or otherwise altered, the claims originally set forth in this and the priority filing(s) are hereby incorporated by reference as part of this section, and the applicant expressly reserves the right to use all of or a portion of any of the content of such as additional description to support any claim or element, any amendment, and any component thereof. The content of this section (both listed and incorporated by reference) shall survive during the entire pendency of this application including any subsequent continuation, division, or continuation-in-part thereof or any reissue or extension thereon.

Finally, it should be understood that the term "at least one" as used in the description and claims is not intended nor used in this disclosure to mean that other claims or descriptions not incorporating the "at least one" language cannot further include one or more like elements and the language "at least one" is not intended nor used to change "open-ended" claims, inherently including devices or methods having additional elements or steps apart from those claimed, into "closed-ended" claims wherein devices or methods having additional elements would not be covered by such claims. Further, if or when used, the use of the transitional phrase "comprising" (or its equivalent in Australia and the like, "including") is used to maintain the "open-end" claims herein, according to traditional claim interpretation. Thus, unless the context requires otherwise, it should be understood that the term "comprise", "include" (if or when inserted), or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. Further, this application should be considered to support claims as follows: Methods substantially as described hereinbefore and with reference to any of the accompanying examples, and apparatus substantially as described hereinbefore and with reference to any of the accompanying examples.

What is claimed is:

1. A plant punch apparatus, comprising:
  a first plant punch element that comprises a first plant punch head,
  a plant punch element relative movement mechanism that is operable to relatively move said first plant punch element through a plurality of spatial points that defines a first plant punch element relative travel path, and a frame that supports said plant punch movement mechanism, wherein said plurality of spatial points comprises a first spatial point having a first horizontal distance from a vertical spatial axis defined by a first plant emergent point, wherein said first plant emergent point is defined by a site at which a first plant emerges from plant growth media in which it is established before it is downwardly punched from its container during a plant punch event, wherein said first plant emergent point defines a plant emergent point horizontal plane, wherein said plurality of spatial points further comprises a second spatial point that:
- defines a second horizontal plane that is below said first spatial point and above said plant emergent point horizontal plane, and
- has a second horizontal distance from said vertical spatial axis, and wherein said first horizontal distance is greater than said second horizontal distance, wherein said first plant punch element relative travel path intersects and passes through and below said plant emergent point horizontal plane, wherein said first plant punch element relative travel path has a vertical component at its intersection with said plant emergent point horizontal plane, wherein said first plant punch element relative travel path has a horizontal component at some point from said first spatial point to said second spatial point of said first plant punch element relative travel path, and wherein said plant punch element relative movement mechanism relatively moves said first plant punch element through said first spatial point and then said second spatial point before said plant punch event.

2. A plant punch apparatus as described in claim 1 wherein said plant punch element relative movement mechanism is operable to relatively move said first plant punch element to generate a plant punch cycle.

3. A plant punch apparatus as described in claim 2 wherein said plant punch element relative movement mechanism comprises a horizontal plant punch relative movement mechanism and a vertical plant punch relative movement mechanism.

4. A plant punch apparatus as described in claim 3 wherein said vertical plant punch relative movement mechanism is manually operable.

5. A plant punch apparatus as described in claim 3 wherein said horizontal plant punch relative movement mechanism is automatically operable.

6. A plant punch apparatus as described in claim 2 wherein said plant punch element relative movement mechanism is manually operable.

7. A plant punch apparatus as described in claim 2 wherein said plant punch element relative movement mechanism is manually operable only in part.

8. A plant punch apparatus as described in claim 2 wherein said plant punch element relative movement mechanism is automatically operable.

9. A plant punch apparatus as described in claim 2 wherein said plant punch element relative movement mechanism is automatically operable only in part.

10. A plant punch apparatus as described in claim 1 wherein said first plant punch element relative travel path passes below said plant emergent point horizontal plane substantially at least by that amount necessary to punch said plant from said container.

11. A plant punch apparatus as described in claim 10 wherein said first plant punch element relative travel path passes below said plant emergent point horizontal plane at least by that amount necessary to transplant said first plant into a container established below said plant emergent point horizontal plane.

12. A plant punch apparatus as described in claim 1 further comprising additional plant punch elements that each comprise a plant punch head, wherein said plant punch element relative movement mechanism is also operable to move said additional plant punch elements through additional, respective plant punch element relative travel paths to punch additional, respective plants, wherein said additional, respective plant punch element relative travel paths are each spatially oriented relative to their additional, respective plant as said first plant punch element travel path is spatially oriented relative to said first plant, and wherein said additional, respective plant punch element relative travel paths are horizontally offset from said first plant punch element relative travel path.

13. A plant punch apparatus as described in claim 12 wherein said first plant punch element and said additional plant punch elements are established in a row by column pattern.

14. A plant punch apparatus as described in claim 1 further comprising said first plant.

15. A plant punch apparatus as described in claim 14 further comprising additional plants that are punched by additional plant punch elements.

16. A plant punch apparatus as described in claim 1 further comprising additional plant punch elements, wherein said plant punch element relative movement mechanism is also operable to relatively move said additional plant punch elements through additional, respective plant punch element travel paths that mimic said first plant punch element relative travel path in parallel fashion.

17. A plant punch apparatus as described in claim 16 wherein said first plant punch element and said additional plant punch elements are established in a row by column pattern.

18. A plant punch apparatus as described in claim 1 further comprising a $n^{th}$ plant punch element that said plant punch element relative movement mechanism is operable to relatively move through a plurality of spatial points that defines a $n^{th}$ plant punch element travel path.

19. A plant punch apparatus as described in claim 18 wherein said $n^{th}$ plant punch element travel path is horizontally offset from said first plant punch element relative travel path.

20. A plant punch apparatus as described in claim 19 wherein respective points on each said first plant punch element relative travel path and said $n^{th}$ plant punch element relative travel path are horizontally equidistant from each other.

21. A plant punch apparatus as described in claim 1 wherein said plurality of spatial points comprises a third spatial point that is substantially co-incident with said plant emergent point.

22. A plant punch apparatus as described in claim 1 wherein said first plant punch element travel path is substantially vertical when it passes through said lower horizontal plane.

23. A plant punch apparatus as described in claim 1 wherein said first spatial point, said second spatial point and said first plant emergent point are substantially within the same vertical plane.

24. A plant punch apparatus as described in claim 1 wherein an upper portion of said first plant punch element relative travel path that is between said first spatial point and said second spatial point of said first plant punch element relative travel path is substantially vertical.

25. A plant punch apparatus as described in claim 1 wherein said plant punch element relatively travels along said first plant punch element relative travel path from said first spatial point of said first plant punch element relative travel path, then through said second spatial point of said first plant punch element relative travel path, then through said plant emergent point horizontal plane.

26. A plant punch apparatus as described in claim 1 wherein, after relatively traveling through said plant emergent point horizontal plane, said first plant punch element reaches a lowest relative position, and then relatively returns to said first spatial point of said first plant punch element relative travel path through a first plant punch element relative return travel path that is part of said first plant punch element relative travel path.

27. A plant punch apparatus as described in claim 26 wherein said first plant punch element relative return travel path comprises said second spatial point and said first spatial point of said first plant punch element relative travel path.

28. A plant punch apparatus as described in claim 26 wherein at least half of said first plant punch element relative return travel path is along said vertical spatial axis.

29. A plant punch apparatus as described in claim 1 wherein said first plant punch element reaches its highest relative point at said first spatial point of said first plant punch element relative travel path.

30. A plant punch apparatus as described in claim 1 wherein said plant punch relative movement mechanism is operable to relatively move said first plant punch element through said horizontal component of said first plant punch element relative travel path through pneumatics.

31. A plant punch apparatus as described in claim 1 wherein said plant punch relative movement mechanism is operable to relatively move said first plant punch element through said vertical component of said first plant punch element relative travel path upon application of a manual force to said plant punch relative movement mechanism.

32. A plant punch apparatus as described in claim 1 wherein said first plant punch element further comprises a first plant punch body.

33. A plant punch apparatus as described in claim 1 wherein an upper portion of said first plant has plant punch sensitive vegetative parts that define a sensitive vegetation profile in a plane defined by said first spatial point and said plant emergent point, and wherein said first plant punch element relative travel path is outside one side of said sensitive vegetation profile.

34. A plant punch apparatus as described in claim 1 wherein said first plant punch element initiates a relative horizontal motion at a horizontal relative motion initiation point located at some point between said first spatial point and said second spatial point and along said first plant punch element relative travel path.

35. A plant punch apparatus as described in claim 34 wherein said horizontal relative motion initiation point has a horizontal relative motion initiation height above said plant emergent point horizontal plane, and wherein said horizontal relative motion initiation height is adjustable.

36. A plant punch apparatus as described in claim 34 wherein said horizontal relative motion initiation point has a horizontal relative motion initiation width that is equal to a horizontal distance of said horizontal relative motion initiation point from said vertical spatial axis, and wherein said horizontal relative motion initiation width is adjustable.

37. A plant punch apparatus as described in claim 1 wherein said horizontal component of said first plant punch element has a horizontal relative motion initiation point between said first spatial point and said second spatial point, and wherein said horizontal relative motion initiation point is spatially adjustable.

38. A plant punch apparatus as described in claim 1 wherein said plant punch element relative movement mechanism is operable to effect a horizontal relative travel distance of said first plant punch element, and wherein said horizontal relative travel distance is adjustable.

39. A plant punch method, comprising the steps of:
relatively moving a first plant punch element having a first plant punch head, from a first spatial point to a second spatial point that is lower than said first spatial point, wherein said first spatial point and said second spatial point partially define a first plant punch element relative travel path,
wherein said first spatial point has a first horizontal distance from a vertical spatial axis that defines a first plant emergent point,
wherein said first plant emergent point is defined by the site at which a first plant emerges from said plant growth media in which it is established before it is punched from its container during a plant punch event,
wherein said second spatial point has a second horizontal distance from said vertical spatial axis, and
wherein said first horizontal distance is greater than said second horizontal distance,
and further comprising the steps of:
relatively moving said first plant punch element through a plant emergent point horizontal plane defined by said first plant emergent point so as to punch said first plant downwardly from its container after performing said step of relatively moving said first plant punch element from said first spatial point to said second spatial point;
punching said first plant from its container;
reaching a lowest first plant punch element relative position;
returning, via relative movement of said first plant punch element, said first plant punch element to said first spatial point; and
completing a plant punch cycle upon performing said step of returning said first plant punch element to said first spatial point.

40. A plant punch method as described in claim 39 further comprising the step of transplanting said first plant.

41. A plant punch method as described in claim 39 wherein said step of relatively moving said first plant punch element through a horizontal plane defined by said first plant emergent point so as to punch said first plant from its container comprises the step of manually relatively moving said plant punch element through use of a plant punch relative movement mechanism.

42. A plant punch method as described in claim 39 wherein said step of relatively moving a first plant punch element from a first spatial point to a second spatial point comprises the step of relatively moving said first plant punch element to have a horizontal component of relative motion.

43. A plant punch method as described in claim 42 wherein said step of relatively moving said first plant punch element to have a horizontal component of relative motion comprises the step of pneumatically relatively moving said first plant punch element through use of a plant punch relative movement mechanism.

44. A plant punch method as described in claim 42 wherein said step of relative moving said first plant punch element to have a horizontal component of relative motion comprises the step of automatically relatively moving said first plant punch element through use of a plant punch relative movement mechanism.

45. A plant punch method as described in claim 39 wherein said step of returning said first plant punch element to said first spatial point comprises the step of returning said plant punch element to said first spatial point only after returning said first plant punch element to said second spatial point.

46. A plant punch method as described in claim 39 wherein said step of returning said first plant punch element to said first spatial point comprises the step of vertically relatively moving said first plant punch element such that substantially at least one third of its relative travel from said lowest first plant punch element relative position to said first spatial point is along said vertical spatial axis.

47. A plant punch method as described in claim 46 wherein said step of vertically relatively moving said first plant punch element such that substantially at least one third of its relative travel from said lowest first plant punch element relative position to said first spatial point is along said vertical spatial axis is performed manually.

48. A plant punch method as described in claim 39 wherein said step of relatively moving said first plant punch element through a plant emergent point horizontal plane defined by said first plant emergent point comprises the step of relatively moving said first plant punch element substantially through said first plant emergent point.

49. A plant punch method as described in claim 39 wherein said step of relatively moving said first plant punch element through a plant emergent point horizontal plane comprises the step of purely vertically relatively moving said first plant punch element.

50. A plant punch method as described in claim 39 wherein said step of relatively moving a first plant punch element from a first spatial point to a second spatial point comprises the step of relatively moving said plant punch element from its highest relative position during a punch cycle.

51. A plant punch method as described in claim 39 wherein said step of relatively moving a first plant punch element from a first spatial point to a second spatial point that is lower than said first spatial point comprises the step of relatively moving said first plant punch element horizontally while also relatively moving said first plant punch element vertically downward.

52. A plant punch method as described in claim 51 wherein said step of relatively moving said first plant punch element horizontally comprises the step of pneumatically relatively moving said first plant punch element.

53. A plant punch method as described in claim 51 wherein said step of relatively moving said first plant punch element vertically downward comprises the step of manually relatively moving said first plant punch element.

54. A plant punch method as described in claim 39 wherein said step of relatively moving a first plant punch element from a first spatial point to a second spatial point that is lower than said first spatial point comprises the step of relatively moving said first plant punch element outside of one side of a sensitive vegetation profile defined by sensitive vegetative parts of an upper portion of said first plant, wherein said sensitive vegetation profile is in a plane defined by said first spatial point and said plant emergent point.

55. A plant punch method as described in claim 39 further comprising the step of relatively moving at least one additional plant punch element through a respective at least one additional plant punch element relative travel path that is each horizontally offset from said first plant punch element relative travel path.

56. A plant punch method as described in claim 55 wherein said plant punch element further comprises a plant punch body.

57. A plant punch method as described in claim 39 wherein said step of relatively moving a first plant punch element from a first spatial point to a second spatial point comprises the step of initiating a horizontal relative motion of said first plant punch element at a horizontal relative motion initiation point.

58. A plant punch method as described in claim 57 wherein the step of initiating a horizontal relative motion of said first plant punch element comprises initiating said horizontal relative motion at a horizontal relative motion initiation height above said plant emergent point horizontal plane, and further comprises the step of adjusting said horizontal relative motion initiation height.

59. A plant punch method as described in claim 57 wherein the step of initiating a horizontal relative motion of said first plant punch element comprises initiating said horizontal relative motion at a horizontal relative motion initiation width that is equal to a horizontal distance of said horizontal relative motion initiation point from said vertical spatial axis, and further comprises the step of adjusting said horizontal relative motion initiation width.

60. A plant punch method as described in claim 39 wherein said step of relatively moving said first plant punch element through a plant emergent point horizontal plane defined by said first plant emergent point so as to punch said first plant from its container comprises the step of relatively moving said first plant punch element through a plant emergent point horizontal plane substantially at said first plant emergent point.

* * * * *